United States Patent
Deprun et al.

(10) Patent No.: US 9,848,282 B2
(45) Date of Patent: *Dec. 19, 2017

(54) METHOD FOR COMMUNICATING WITH OTHER DEVICES, AND COMMUNICATION DEVICE

(71) Applicant: LG ELECTRONICS INC., Seoul (KR)

(72) Inventors: Jean-Francois Deprun, Paris (FR); Younsung Chu, Anyang-si (KR); Jihye Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 434 days.

This patent is subject to a terminal disclaimer.

(21) Appl. No.: 14/591,643

(22) Filed: Jan. 7, 2015

(65) Prior Publication Data

US 2015/0117260 A1 Apr. 30, 2015

Related U.S. Application Data

(63) Continuation of application No. 13/702,528, filed as application No. PCT/KR2011/004176 on Jun. 8, 2011, now Pat. No. 8,958,343.

(Continued)

(51) Int. Cl.
*H04W 4/00* (2009.01)
*H04W 48/14* (2009.01)
(Continued)

(52) U.S. Cl.
CPC .......... *H04W 4/008* (2013.01); *H04W 48/14* (2013.01); *H04W 76/00* (2013.01); *H04W 84/18* (2013.01); *H04W 88/16* (2013.01)

(58) Field of Classification Search
CPC ..... H04W 48/14; H04W 76/00; H04W 4/008; H04W 84/18; H04W 88/16
See application file for complete search history.

(56) References Cited

U.S. PATENT DOCUMENTS

| 8,958,343 | B2 * | 2/2015 | Deprun | H04W 76/00 370/255 |
| 9,014,055 | B2 * | 4/2015 | Deprun | H04W 76/00 370/255 |

(Continued)

FOREIGN PATENT DOCUMENTS

| KR | 1020100050620 | 5/2010 |
| KR | 1020100051887 | 5/2010 |
| KR | 1020100053714 | 5/2010 |

*Primary Examiner* — Redentor Pasia
*Assistant Examiner* — Peter Mak
(74) *Attorney, Agent, or Firm* — Lee, Hong, Degerman, Kang & Waimey

(57) ABSTRACT

One embodiment relates to a method performed by a converged personal network service (CPNS) enabled entity. The communication method comprises a step in which the CPNS enabled entity transmits a request message for instructing performance of a discovery procedure to a first PNE which belongs to a first network if a second PNE which belongs to a second network is not found in the coverage of the first network at the state where the CPNS enabled entity is established as a gateway for managing the first network; a step in which the CPNS enabled entity receives, from the first PNE, a response message; and a step of transmitting, based on the response message, a bridge request message for requesting that the second PNE operates as a bridge for interconnecting the first network and the second network, to a second gateway which manages the second network.

10 Claims, 14 Drawing Sheets

Related U.S. Application Data

(60) Provisional application No. 61/352,800, filed on Jun. 8, 2010, provisional application No. 61/353,182, filed on Jun. 9, 2010, provisional application No. 61/356,644, filed on Jun. 20, 2010, provisional application No. 61/386,954, filed on Sep. 27, 2010, provisional application No. 61/419,877, filed on Dec. 6, 2010.

(51) Int. Cl.
*H04W 76/00* (2009.01)
*H04W 88/16* (2009.01)
*H04W 84/18* (2009.01)

(56) References Cited

U.S. PATENT DOCUMENTS

2005/0122944 A1* 6/2005 Kwon ................. H04L 12/4625
370/338
2010/0293183 A1 11/2010 Yaqub
2011/0182205 A1* 7/2011 Gerdes ................ H04L 12/2818
370/254

\* cited by examiner

METHOD FOR COMMUNICATING WITH OTHER DEVICES, AND COMMUNICATION DEVICE

This application is a continuation of U.S. patent application Ser. No. 13/702,528, filed on Dec. 6, 2012, now U.S. Pat. No. 8,958,343, which is the National Stage filing under 35 U.S.C. 371 of International Application No. PCT/KR2011/004176, filed on Jun. 8, 2011, which claims the benefit of U.S. Provisional Application No. 61/352,800, filed on Jun. 8, 2010, 61/353,182, filed on Jun. 9, 2010, 61/356,644, filed on Jun. 20, 2010, 61/386,954, filed on Sep. 27, 2010, and 61/419,877, filed on Dec. 6, 2010, the contents of which are all hereby incorporated by reference herein in their entirety.

TECHNICAL FIELD

The present invention relates to Converged Personal Network Service (CPNS).

BACKGROUND ART

From among a variety of developed technologies, the existing technology, such as DLNA or ZigBee, has placed emphasis on the search and use of the services of devices within a specific PAN. Tethering technology has placed emphasis on a connection between heterogeneous networks.

In contrast, unlike this simple PAN, a CPNS concept has been proposed.

In CPNS, devices belonging to a Personal Network (PN) (or also called a Personal Area Network (PAN)) receive several services.

This CPNS is implemented by way of a CPNS server, a CPNS gateway, and devices which support CPNS. In addition, there may be a common server and common devices.

In the CPNS, a bundle of devices is called a PN based on a personal network. The CPNS gateway is placed within the PN, the services of devices belonging to the PN are registered with the CPNS server through the CPNS gateway, a device that provides a specific service can be searched for by the CPNS server, and an external entity can share the service provided by the device based on the search.

The CPNS gateway functions to connect a PN (also called a gateway 'GW') to another network. The CPNS device is also called a Personal Network Entity (PNE). The CPNS device is a member of a PN, and several devices may be grouped into one PNE or a single device may become a PNE.

FIG. 1 is an exemplary diagram showing a concept of CPNS.

As shown in FIG. 1, common servers, CPNS servers, CPNS gateways, CPNS devices, and common devices are shown.

The CPNS server can communicate with one or more CPNS gateways (i.e., PN gateway) and transmit and receive data. Each CPNS server can exchange data by communicating with one or more CPNS devices within a PN (or called a Personal Area Network (PAN)) through the CPNS gateway.

Each of the CPNS devices can transmit and receive data to and from one or more other CPNS devices or common devices through the CPNS gateway.

The CPNS gateway can transmit and receive data by communicating with a CPNS server, a CPNS gateway belonging to another PN, or a CPNS device.

Each CPNS server can transmit and receive data by communicating with a common server and a CPNS gateway.

For example, the CPNS server and the CPNS gateway can communicate with each other over a cellular network, and the CPNS gateway and the CPNS device can communicate with each other using near-field communication, for example, Bluetooth, NFC, ZigBee, or Wi-Fi.

Meanwhile, the CPNS server manages and controls communication between the CPNS gateway and the CPNS device, and so applications and pieces of information are exchanged, thereby being capable of increasing user experience. For example, in FIG. 1, a user can obtain position information from another CPNS device (e.g., a GPS) using a specific CPNS device, transmit the position information to a CPNS server through the CPNS gateway, and receive position-based service from the CPNS server.

As a result, the user can be provided with various services through several CPNS devices that belong to the PN.

DISCLOSURE

Technical Problem

The aforementioned conventional technology has proposed only the concept of CPNS, but has not proposed a necessary technical specification in order to implement this CPNS service.

Accordingly, an object of this specification is to provide detailed technology for implementing CPNS service.

Technical Solution

In order to achieve the above object, an embodiment of the present invention provides a method of communicating with other devices, which is performed by a communication device including a Converged Personal Network Service (CPNS)-enabled entity. The communication method can include the steps of sending a request message for indicating the execution of a discovery procedure to a first Personal Network Entity (PNE) belonging to a first network if a second PNE belonging to a second network fails in discovering the coverage of the first network in the state in which the CPNS-enabled entity is set as a gateway so that the CPNS-enabled entity manages the first network; the CPNS-enabled entity receiving a response message, including a result of the execution of the discovery procedure, from the first PNE; and determining whether or not to transmit a bridge request message based on the response message. Here, the bridge request message may be determined to be transmitted if the response message includes information on the second PNE belonging to the second network as the result of the execution of the discovery procedure. The communication method can further include the steps of sending a bridge request message for requesting, from a second gateway managing the second network, that the second PNE operates as a bridge for coupling the first network and the second network to the second gateway via the first PNE and the second PNE and sending a bridge request message for requesting that the first PNE operates as a bridge for coupling the first network and the second network to the first PNE when a bridge response message is received from the second gateway.

If the bridge response message may include a value indicative of allowance, the bridge request message is transmitted to the first PNE. If the second gateway receives a positive response from a user, the bridge response message may include the value indicative of the allowance.

The request message for indicating the execution of the discovery procedure may be transmitted to several devices within the first network. The response message may be received from one or more of the several devices. The determining step may further include the step of determining whether or not to send the bridge request message via the first PNE based on the response message from one or more of the several devices. The determining step may further include the step of determining whether or not to operate the second PNE as the bridge based on the response message from one or more of the several devices.

The CPNS-enabled entity may be a status in which the CPNS-enabled entity is unable to be directly connected with the second PNE, and the second gateway may be a status in which the second gateway is unable to be directly connected with the first PNE.

Meanwhile, in order to achieve the above object, an embodiment of the present invention provides a method of communicating with other devices, which is performed by a communication device including a Converged Personal Network Service (CPNS)-enabled entity. The communication method may include the steps of receiving a discovery request message, including information on a second gateway managing a second network and information on the second network, from a second Personal Network Entity (PNE) belonging to the second network in the state in which the CPNS-enabled entity is set as a first PNE and belongs to a first network managed by a first gateway and comparing the received information on the second network with information on the first network. Here, the information on the first network might have been obtained in a procedure of setting up a connection with the first gateway. The communication method may further includes the steps of sending an information update request message, including the information on the second network, to the first gateway if one or more of the pieces of information are different and receiving a bridge request message from the first gateway. Here, the bridge request message may be received from the first gateway if a PNE belonging to the coverage of the first network and the coverage of the second network is not present and the first network and the second network are able to be coupled through the first PNE and the second PNE. The communication method may further include the steps of sending a bridge request message for requesting that the second PNE operates as a bridge to the second PNE in response to the reception of the bridge request message and activating a bridge for coupling the first network and the second network when a bridge response message is received from the second PNE.

The first gateway may be a status in which the first gateway is unable to be directly connected with the second PNE, and the second gateway may be a status in which the second gateway is unable to be directly connected with the first PNE.

When the bridge is activated, a communication link may be set up between the first gateway and the second gateway via the first PNE and the second PNE.

Meanwhile, in order to achieve the above object, an embodiment of the present invention provides a communication device. The communication device may include a storage unit for storing a Converged Personal Network Service (CPNS)-enabled entity set as a gateway so that the CPNS-enabled entity manages a first network; a transceiver unit for sending a request message for requesting the execution of a discovery procedure to a first Personal Network Entity (PNE), belonging to the first network, if the CPNS-enabled entity fails in discovering a second PNE belonging to a second network within the coverage of the first network and enabling the CPNS-enabled entity to receive a response message, include a result of the execution of the discovery procedure, from the first PNE; and a control unit for determining whether or not to send a bridge request message based on the response message.

Here, the bridge request message may be determined to be transmitted if the response message includes information on the second PNE belonging to the second network as the result of the execution of the discovery procedure.

The transceiver unit may send a bridge request message for requesting, from a second gateway managing the second network, that the second PNE operates as a bridge for coupling the first network and the second network to the second gateway via the first PNE and the second PNE if the bridge request message is determined to be transmitted and send a bridge request message for requesting that the first PNE operates as a bridge for coupling the first network and the second network to the first PNE when a bridge response message is received from the second gateway.

Advantageous Effects

An embodiment of the present invention has solved the aforementioned conventional problem. That is, an embodiment of the present invention proposes detailed technology for implementing CPNS service.

MODE FOR INVENTION

Figure 1:
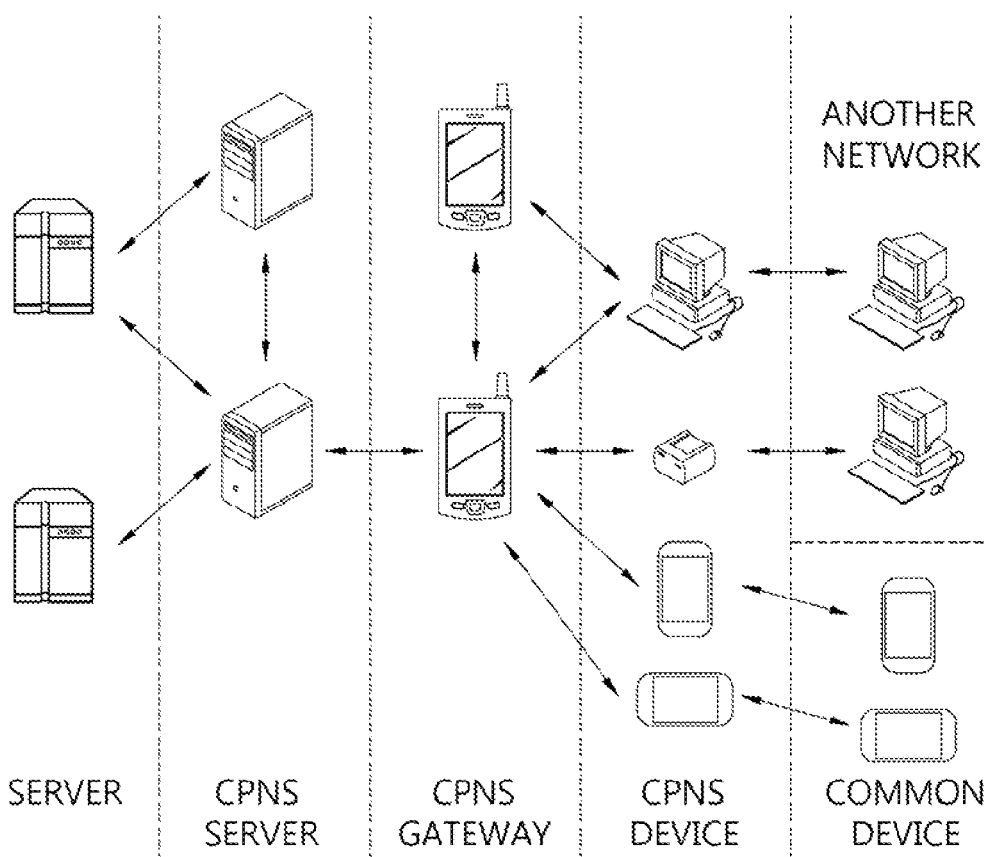
FIG. 1 is an exemplary diagram showing a concept of CPNS.

The present invention relates to Converged Personal Network Service (CPNS). However, the present invention is not limited to the CPNS and can be applied to all communication systems and methods and other systems to which the technical spirit of the present invention can be applied.

Technical terms used in this specification are used to describe only specific embodiments, and it is to be noted that the terms are not intended to limit the present invention. Furthermore, the technical terms used in this specification should be interpreted as having meanings that are commonly understood by a person having ordinary skill in the art to which the present invention belongs, unless specifically defined in this specification, and should not be interpreted as having excessively comprehensive meanings or excessively reduced meanings. Furthermore, if the technical terms used in this specification are erroneous technical terms that do not precisely represent the spirit of the present invention, they should be replaced with technical terms that may be correctly understood by a person having ordinary skill in the art and understood. Furthermore, common terms used in the present invention should be interpreted according to the definitions of dictionaries or according to the context and should not be interpreted as having excessively reduced meanings.

Furthermore, an expression of the singular number used in this specification includes an expression of the plural number unless clearly defined otherwise in the context. In this application, terms, such as "comprise" and "include", should not be interpreted as essentially including all several elements or several steps described in the specification and should be interpreted as not including some of the elements or steps or as including additional element or steps.

Furthermore, terms including ordinal numbers, such as the first and the second used in this specification, may be used to describe a variety of elements, but the elements should not be limited to the terms. The terms are used to only distinguish one element from the other element. For example, a first element may be named a second element and likewise a second element may be named a first element without departing from the scope of the present invention.

When it is said that one element is described as being "connected" or "coupled" to the other element, it should be understood that one element may be directly connected or coupled to the other element, but a third element may be interposed between the two elements. In contrast, when it is said that one element is described as being "directly connected" or "directly coupled" to the other element, it should be understood that a third element is not interposed between the two elements.

Hereinafter, preferred embodiments according to the present invention are described in detail with reference to the accompanying drawings. The same or similar elements are assigned the same reference numerals irrespective of reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

Although a terminal is illustrated hereafter, the terminal can be called User Equipment (UE), Mobile Equipment (ME), a Mobile Station (MS), a User Terminal (UT), a Subscriber Station (SS), a wireless device, a handheld device, or an Access Terminal (AT). Furthermore, the terminal can be a portable device equipped with a communication function, such as a mobile phone, a PDA, a smart phone, a wireless modem, or a notebook, or can be a not-portable device, such as a PC or a device mounted on a vehicle.

Definition of Terms

Prior to a description with reference to the drawings, terms used in this specification are defined in brief in order to help understanding of the present invention.

1) Converged Personal Network Service (CPNS): CPNS enables devices to belong to a Personal Network (PN) (or also called a Personal Area Network (PAN)) and to receive several services. When comparing this CPNS with common tethering service, tethering service is technology for allowing a device that has simply accessed the Internet to allocate a private IP address to a different device using NAT technology so that the different device can access the Internet using the private IP address. In contrast, in CPNS, a first device of a user allocates a private IP address to other devices and also integrates and manages several services that can be provided over a mobile communication network. When several services are integrated and managed by the first device of the user as described above, the services can be shared between several devices of users seamlessly. For example, a first device of a user uses video on demand (VoD) and can transfer the VoD to a second device seamlessly. Accordingly, user convenience can be increased. Furthermore, in CPNS, when the user owns several devices, an external server can determine that service data must be transmitted to which one of the several devices when the external server tries to transfer the service data to the user even when there is no request from the user. For example, in the case where a user owns several devices capable of video telephony, when the user receives a video call request, an external server can determine that the video telephony call must be transferred to which one of the several devices. Furthermore, in CPNS, the video call that is in progress can be transferred to another device of the user seamlessly. This CPNS is achieved by a CPNS-enabled entity that is included in a device of a user.

2) a CPNS-enabled entity: the CPNS-enabled entity is a logical entity, and the CPNS-enabled entity can include three types. That is, a PNE, a PN GW, and a CPNS server can be present. A CPNS server entity is placed within a core network, and a PNE and a PN GW are placed within CPNS device.

3) a CPNS device: the CPNS device can operate in several modes at the same time within a personal network. The CPNS device has a function of processing, storing, and playing content. Furthermore, the CPNS device can have a communication interface that enables other CPNS device to operate in different modes within a personal network.

4) a CPNS server: The CPNS server is a function entity capable of providing resources to CPNS entities in response to a request or in a push manner. The CPNS server registers devices and user-related services, stores corresponding information, and provides the registration of a PN, that is, a bundle of devices, and the registration of a service group including a PN and a WAN. Furthermore, the CPNS server can communicate with external entities, such as a content providing server. The CPNS server is the subject that sets a key for authenticating a device owned by a user in order to perform service over a CPNS framework. Furthermore, the CPNS server registers externally provided services and supports searches and/or consumption/providing requests so that device can consume the services.

5) a Personal Network (PN): the PN is a set of devices that enable users to consume or generate services. All devices within the PN can be connected to a PN GW. The PN can be changed over time. The PN can include a device at least operating in GW mode and a different device operating as a PNE.

6) a PNE: the PNE is an abbreviation of a Personal Network Element and is a member that forms a PN. The PNE can consume or provide service or content. The PNE is the subject that consumes actual content, applications, and service. The PNE is the subject that is a member when producing a PN within a CPNS framework and forming a service group.

7) a PN GW: the PN GW is an abbreviation of a Personal Network Gateway and is an entity that is present within a PN and a wide area network. The PN GW can generate a PN that provides CPNS service. Furthermore, the PN GW is responsible for a connection with a heterogeneous network for a device that is present within a PN, but is unable to perform an external connection. The PN GW registers a CPNS server for connected devices and manages inventories.

A PN GW within a device allows not only a PNE present within a PN, but also another device to be connected to a CPNS server. A PN GW present within a device uses a global network, such as a mobile network. Furthermore, a PN GW manages service with PNEs and manages communication and pieces of other function information.

8) a PN inventory: the PN inventory is a list of PNs, PNs belonging to several PNs, and devices.

9) a service group: The service group is a set of PNEs and a PN GW that share services, data, and applications. The service group refers to a bundle of devices that are registered with a server through a generated PN. Here, all devices, that is, members of a service group, do not need to be dependent on one PN, and the devices include devices which are spaced apart from one another because they belong to several PNs and cannot be connected. Furthermore, the devices do not need to be devices owned by the same user.

10) a zone: the zone refers to a specific area zone.

11) zone-based service: the zone-based service refers to a CPNS service that is provided within the coverage of a zone-based PN GW.

12) a zone PN GW: the zone PN GW is a PN GW that provides unique service or content within a zone.

13) Mode of a CPNS-enabled entity: CPNS device can operate as a PN GW in PNE mode. The mode can be checked between devices through a CPNS entity discovery function. A PN has to include at least a device operating as a PN GW and a PNE operating as a PNE. A PNE and a PN GW have to know mutual modes in order to generate or participate in a PN. A PN GW has to be able to identify a PNE in order to produce a member of a PN. Furthermore, a PNE has to know a PN GW in order to generate a PN newly or participate in the existing PN.

If there are devices (e.g., an MP3 player and a smart meter) that support only PNE mode, the devices operate only in PNE mode. If a device can operate as only a PN GW, the device operates as a PN GW. If a device can operate as any one of a PN GW and a PNE, the mode of the device can operate as one of the PN GW and the PNE according to a previously stored configuration value and can be changed depending on user setting or service provider setting.

Figure 2:
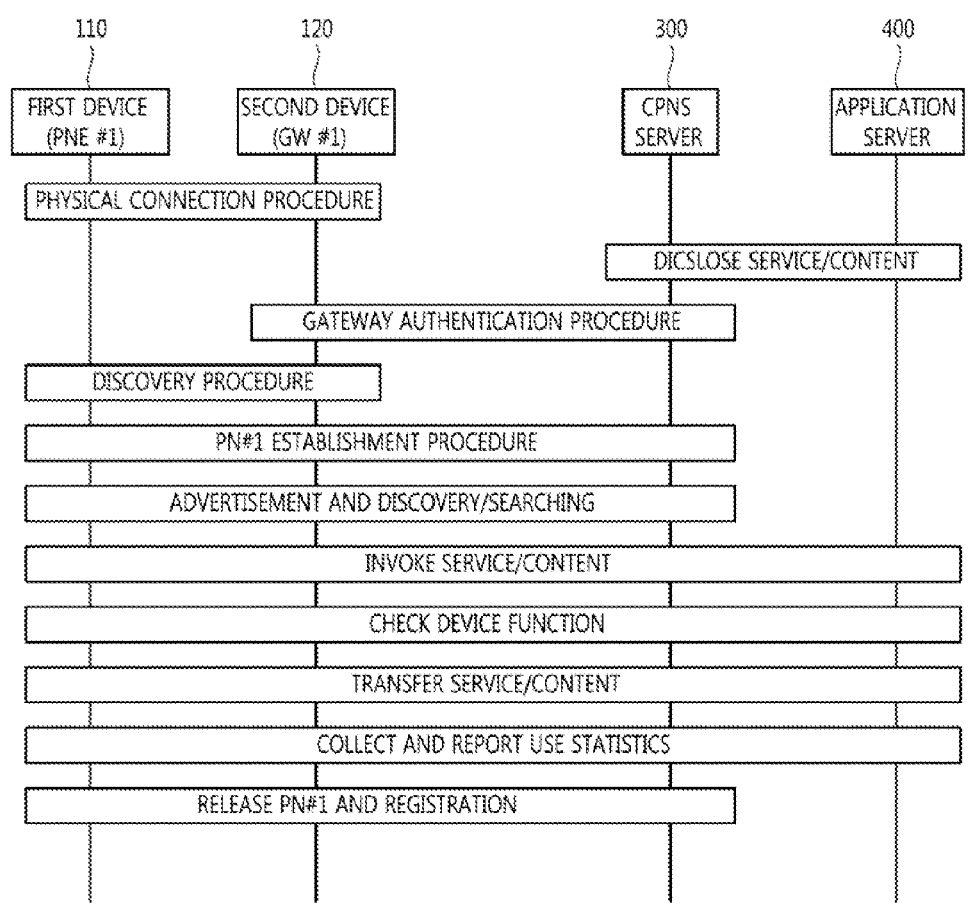
FIG. 2 is an exemplary diagram showing the entire CPNS procedure.

FIG. 2 is an exemplary diagram showing the entire CPNS procedure.

As can be seen with reference to FIG. 2, a first device 110, a second device 120, a CPNS server 300, and an application server 400 are shown.

The first and the second devices 110 and 120 are devices owned by a user A. The first device 110 is a cellular phone of the user A and can be equipped with a first transceiver for connecting to the CPNS server 300 over a mobile communication network. Furthermore, the first device 110 can include a second transceiver, such as Bluetooth, Wi-Fi, or ZigBee, so that it can form a personal network. The second device 120 is a portable multimedia device of the user A. The second device 120 does not include a first transceiver capable of communication with a mobile communication network and can include only a second transceiver, such as Bluetooth, Wi-Fi, or ZigBee capable of forming a personal network.

The first and the second devices 110 and 120 can include CPNS-enabled entities. Each of the CPNS-enabled entities can operate in gateway mode or Personal Network Entity (PNE) mode. FIG. 2 illustrates that the second device 120 operates as a gateway because it includes a first transceiver capable of a connection over a mobile communication network.

The first device 110 and the second device 120 first perform a physical connection procedure through the second transceivers when they are located at a long distance. Meanwhile, the application server 400 registers service and content with the CPNS server 300 or advertises the service and content. Furthermore, the CPNS server 300 performs a procedure of authenticating the second device 120 that operates as the gateway.

Meanwhile, when the first device 110 and the second device 120 complete the physical connection procedure, the CPNS-enabled entities of the first device 110 and the second device 120 perform procedures of searching for them.

When the searches are completed, the devices configure PN#1. Here, information on the PN#1 is registered with the CPNS server 300.

When the configuration of the PN#1 is completed, the CPNS server 300 advertises its own services to the devices within the PN#1 or performs a procedure of searching for services that can be provided by the devices within the PN#1.

When a specific device within the PN#1 invokes specific service or content among the advertised services, a procedure of checking the function of the specific device is performed and the specific service or content is transferred to the specific device according to the checked function.

When the specific device uses the specific service or content, use statistics are gathered and reported to the CPNS server 300 or the application server 400.

Meanwhile, if the PN#1 is no longer necessary, the PN#1 is released and information on the PN#1 can be deregistered from the CPNS server 300.

Figure 3:
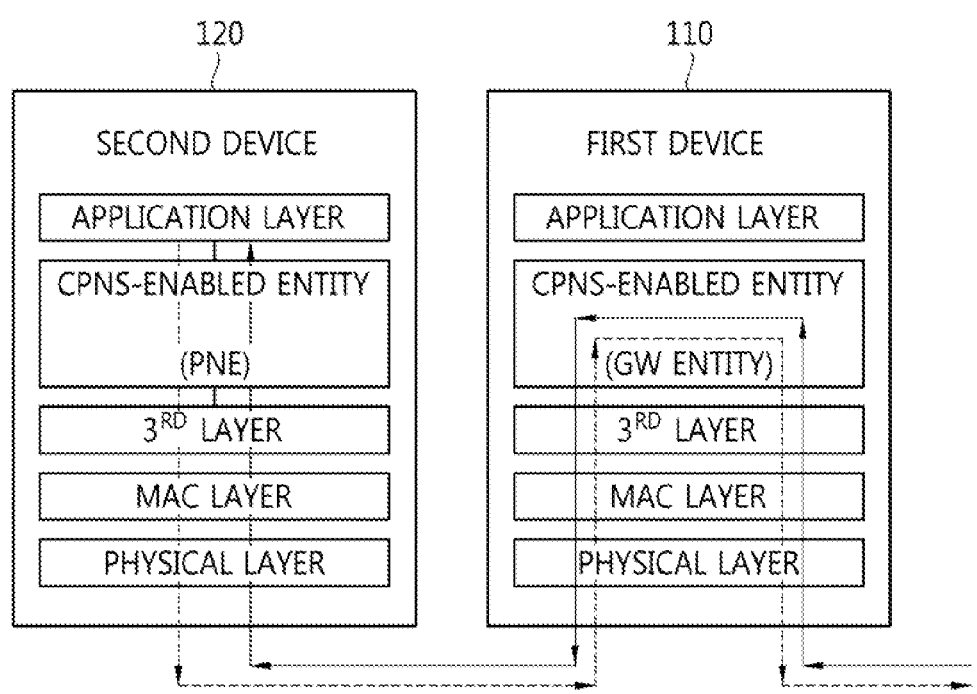
FIG. 3 shows the architecture of first and second devices shown in FIG. 2.

FIG. 3 shows the architecture of the first and second devices shown in FIG. 2.

As can be seen with reference to FIG. 3, a physical layer, an MAC layer, a $3^{rd}$ layer, a CPNS-enabled entity, and an application layer are present in each of the first and the second devices 110 and 120. Here, the CPNS-enabled entity of the second device 120 operates in PNE mode, and the CPNS-enabled entity of the first device 110 drives only a gateway entity. In contrast, the CPNS-enabled entity of the first device 110 drives a gateway entity.

Accordingly, as indicated by a thick solid line in FIG. 3, service data is transferred to the gateway entity within the CPNS-enabled entity of the first device 110 via the physical layer, the MAC layer, and the $3^{rd}$ layer of the first device 110. When the gateway entity of the first device 110 receives the service data, the service data is transferred to the second device 120 via the CPNS-enabled entity, the $3^{rd}$ layer, the MAC layer, and the physical layer of the first device 110.

In the second device 120, the PNE of the CPNS-enabled entity receives the service data via the physical layer, the MAC layer, and the $3^{rd}$ layer.

Meanwhile, the PNE within the CPNS-enabled entity of the second device 120 transmits a control message, such as a request message or a response message, to the first device 110 via the $3^{rd}$ layer, the MAC layer, and the physical layer.

Figure 4:
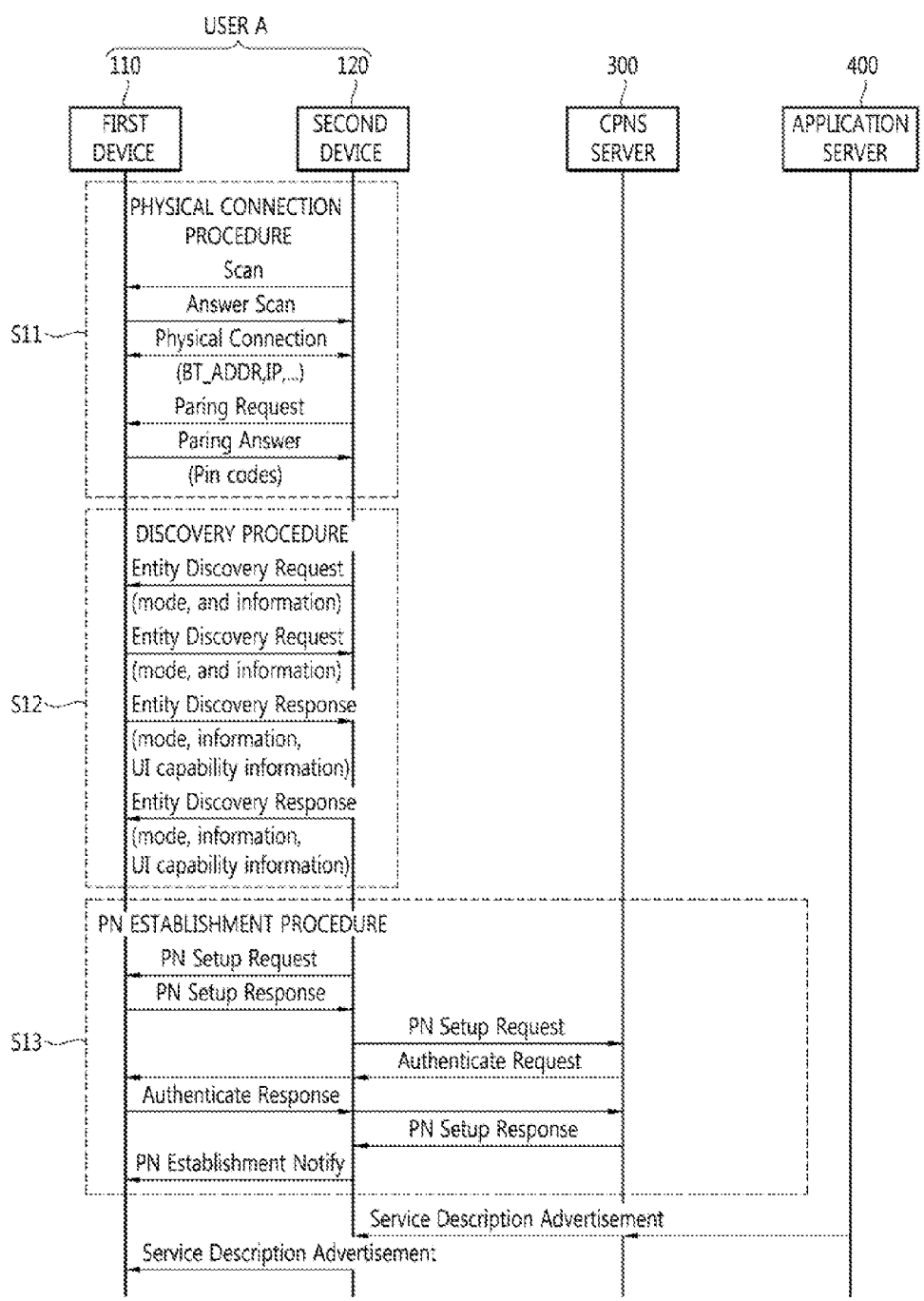
FIG. 4 is an exemplary diagram showing a CPNS-initial procedure.

FIG. 4 is an exemplary diagram showing a CPNS-initial procedure.

As can be seen with reference to FIG. 4, a paring procedure S11 corresponding to a physical connection procedure, an entity discovery procedure S12, and a PN establishment procedure S13 are performed.

First, the paring procedure S11 is described. In the state in which there is no connection between the devices of a user A, a physical connection is initiated between the shown devices.

To this end, a second device 120 starts scan. To this end, the second device can transmit a scan message to the first device 110. The first device 110 transmits a scan response message to the second device 120 in order to respond to the scan. In response thereto, a procedure for a physical connection is initiated and pieces of information for the physical connection, for example, an address and an IP address are exchanged between the first device and the second device. After the pieces of information are exchanged, the second device transmits a physical connection request message, for example, a paring request message to the first device. The first device receives a pin code from the user and transmits a connection request response message including the pin code, for example, a paring response message to the second device. If the pin code is correct, the physical connection procedure is completed.

Meanwhile, when the physical connection is completed, each of the CPNS-enabled entities within the devices performs a procedure for discovering them, that is, the entity discovery procedure S12.

Concretely, first, the CPNS-enabled entity of the second device 120 transmits a discovery request message, for example, an entity discovery request message to the first device 110. The discovery request message, for example, the entity discovery request message includes information on mode of the CPNS-enabled entity within the second device and information on the CPNS-enabled entity and other devices previously retrieved. Here, if the CPNS-enabled entity within the second device is set as a gateway, the mode information can include information indicative of the gateway.

Meanwhile, the CPNS-enabled entity of the first device 110 also transmits a discovery request message, for example, an entity discovery request message to the second device 120. Likewise, the discovery request message, for example, the entity discovery request message includes information on mode of the CPNS-enabled entity within the first device 110 and information on the CPNS-enabled entity and other devices previously retrieved. Here, if the CPNS-enabled entity within the first device is set as a Personal Network Entity (PNE), the mode information can include information indicting the PNE.

In response to the discovery request message received from the second device, the CPNS-enabled entity of the first device 110 transmits a discovery response message, for example, an entity discovery response message to the second device 120. The discovery response message, for example, the entity discovery response message includes the mode information, the information on the CPNS-enabled entity and other devices previously retrieved, and information on a UI function.

Likewise, in response to the discovery request message received from the first device, the CPNS-enabled entity of the second device 120 transmits a discovery response message, for example, an entity discovery response message to the first device 110.

When the discovery procedure is completed by the above signals, the PN establishment procedure S13 is performed.

Concretely, if the CPNS-enabled entity of the second device 120 is set as a gateway, a PN setup request message is transmitted to a device set as a PNE, for example, the first device 110. Here, the PN setup request message can include information on the gateway and information on entities to be included in a PN that will be generated (e.g., a CPNS-enabled entity within the first device).

When the CPNS-enabled entity of the first device transmits a PN setup response message to the second device, the CPNS-enabled entity of the second device 120 transmits a PN setup request message to the CPNS server 300.

When the PN setup request message is received, the CPNS server 300 transmits an authentication request message to the first device through the second device 120 that operates as the gateway. In response to the authentication request message, the first device transmits an authentication response message to the CPNS server 300 through the second device that operates as the gateway.

When the authentication response message is received, the CPNS server 300 transmits the PN setup response message to the second device 120 that operates as the gateway.

In response thereto, the CPNS-enabled entity of the second device 120 that operates as the gateway transmits a PN establishment-complete notify message to the first device.

When the establishment of the PN is completed by the transmission and reception of the messages, the application server 400, such as a content server, can transfer a service description advertisement message, including information on its own service, to the second device 120, that is, the gateway, through the CPNS server 300. In response thereto, the second device 120, that is, the gateway, transfers the service description advertisement message to devices that belong to the PN managed by the second device 120.

Figure 5:
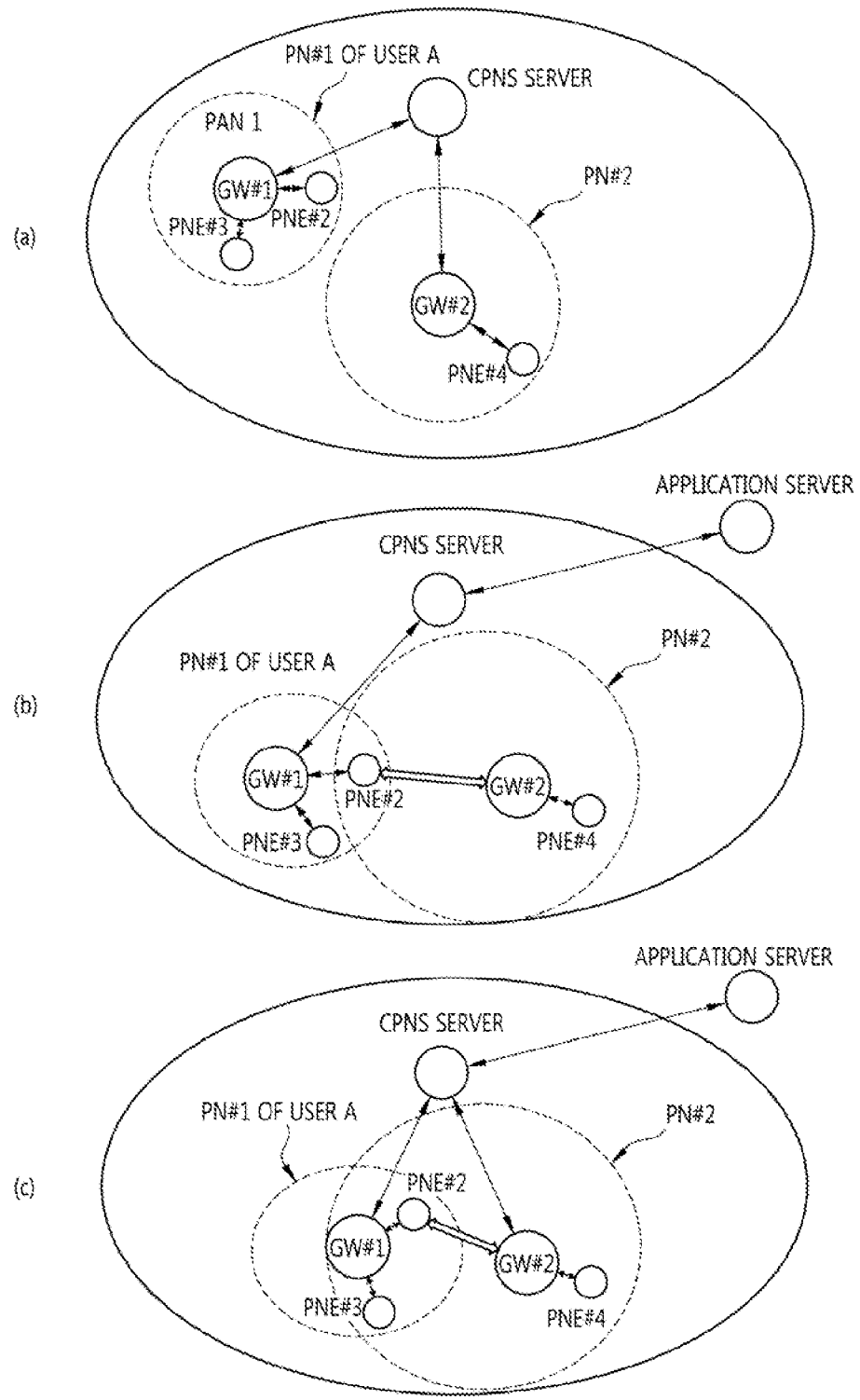
FIG. 5 shows an example in which the PN of a user A overlaps with another PN as the user A geographically moves.

FIG. 5 shows an example in which the PN of a user A overlaps with another PN as the user A geographically moves.

First, FIG. 5(*a*) illustrates two PNs, a CPNS server, and an application server. The PN#1 of the two PNs has been generated by a user A. The PN#1 includes the devices of the user A and can include, for example, a GW#1, a PNE#2, and a PNE#3 as shown. It is here assumed that the GW#1 is the cellular phone of the user A and the PNE#2 and the PNE#3 are the portable multimedia devices of the user A. Meanwhile, the PN#2 of the two PNs includes a GW#2 and a PNE#4. The application server can provide service to the PNEs within the PNs through the CPNS server and the GW#1 and the GW#2.

Meanwhile, as shown in FIG. 5(*b*), it is assumed that the user A has got off a vehicle with the GW#1 left in the vehicle and has geographically moved and moved within the coverage of the PN#2 in the state in which the user A carries only the PNE#2 and the PNE#3. In this case, it is assumed that the PNE#3 is unable to communicate with the GW#2 because the communication method of the PNE#3 is different from the communication method of the GW#2 of the PN#2.

In this situation, there is a problem in that although the user A wants to receive service provided by the PN#2 through the PNE#3, the user A cannot receive the service because the PNE#3 cannot communicate with the GW#2.

In order to solve this problem, the PNE#2 must perform communication with the GW#2, receive the service from the GW#2, and transmit the service to the PNE#3 as shown. That is, the PNE#2 must operate as a bridge.

Meanwhile, as shown in FIG. 5(c), it is assumed that the user A has geographically moved and moved within the coverage of the PN#2 in the state in which the user A carries the GW#1, the PNE#2, and the PNE#3.

In this situation, if the user A wants to receive service provided by the PN#2 through the PNE#3, the PNE#2 may operate as a bridge, receive service from the GW#2, and transmit the service to the PNE#3 or the PNE#3 may operate as a bridge and receive the service from the GW#2. When two or more PNEs operate as bridges as described above, there may be a problem in that which PNE has to be selected.

Accordingly, a scheme for operating a PNE as a bridge and a scheme for selecting a bridge are hereinafter described.

Figure 6:
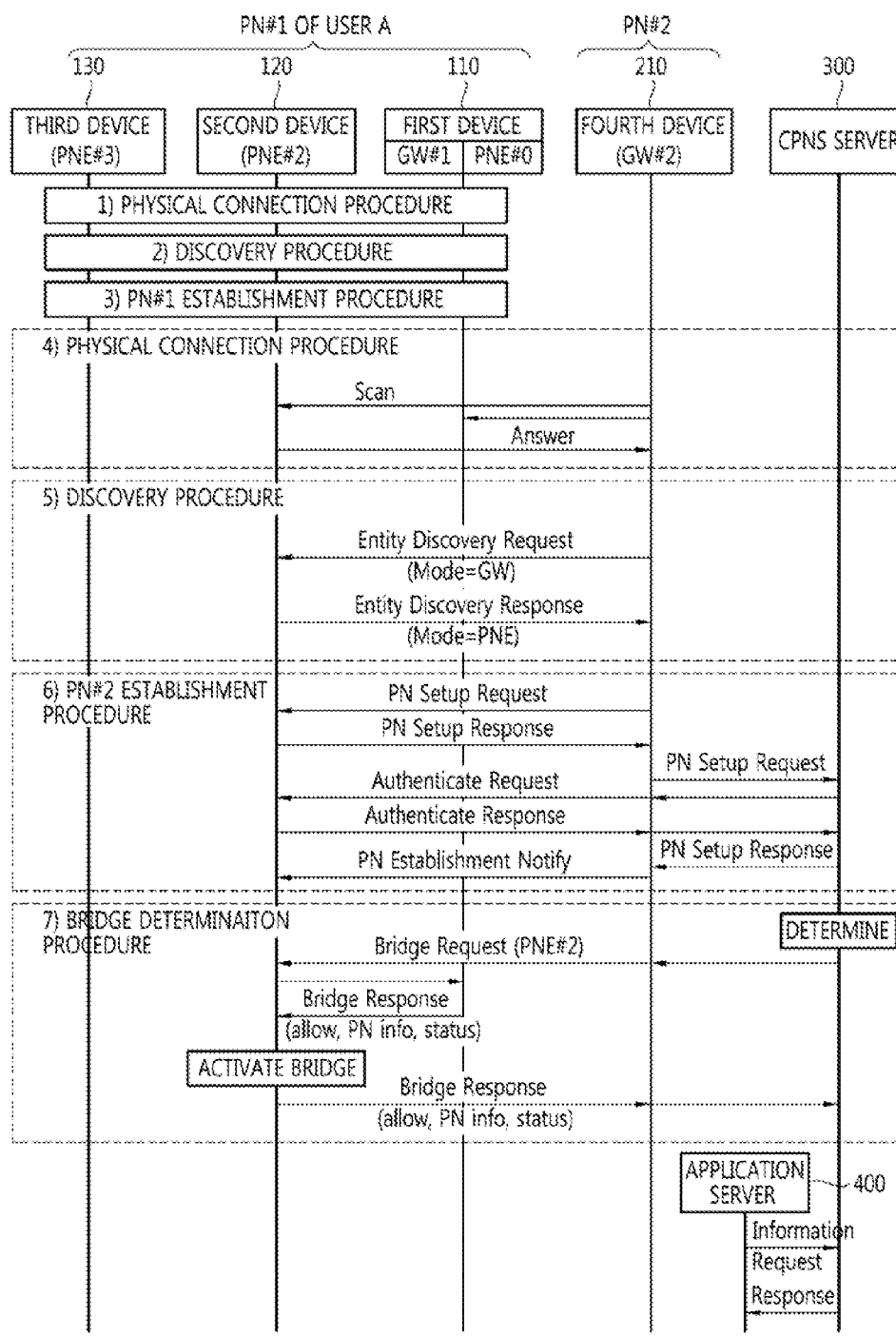
FIG. 6 shows a signal flow for operating a specific device as a bridge in accordance with a first embodiment.

FIG. 6 shows a signal flow for operating a specific device as a bridge in accordance with a first embodiment.

As can be seen with reference to FIG. 6, the first embodiment illustrates a detailed procedure in which a specific device, for example, a second device 120 is made to operate as a bridge.

The first embodiment of FIG. 6 illustrates that a determination of whether a specific one of the devices of a user A will be operated as a bridge or not and if a specific device has to be operated as a bridge, which device will be operated as the bridge is performed by a CPNS server.

Concretely, as can be seen with reference to FIG. 6, the user A owns a first device 110 operating as a gateway (e.g., a GW#1), the second device 120 operating as a PNE#2, and a third device 130 operating as a PNE#3. It is assumed that the first device 110 is a cellular phone and the second device 120 and the third device 130 are portable multimedia devices.

1) When the first device 110, the second device 120, and the third device 130 are located a short way off, a physical connection procedure is performed. Here, a CPNS-enabled entity within the first device 110 reads in its own mode setting value, activates a gateway entity based on the mode setting value, and deactivates a PNE. Likewise, CPNS-enabled entities within the second device 120 and the third device 130 read in their own mode setting values, activate their PNEs based on the mode setting values, and deactivate their gateway entities.

2) Next, a mutual discovery procedure is performed between the first device 110, the second device 120, and the third device 130.

3) Furthermore, the first device 110, the second device 120, and the third device 130 generate a PN#1 by performing a PN establishment procedure therebetween.

4) Meanwhile, it is assumed that the user A has geographically moved and moved within the coverage of a PN#2 in the state in which the user A carries the second device 120. It is here assumed that the PN#2 is managed by a fourth device 210 operating as a gateway (e.g., a GW#2).

It is here assumed that the user A wants to receive service, provided by the PN#2, using the third device 130 that is not located within the coverage of the PN#2.

When the user A has geographically moved and moved within the coverage of the PN#2 in the state in which the user A carries the second device 120, the fourth device 210 within the PN#2 performs a physical connection procedure.

Concretely, the fourth device 210 can transmit a scan message to the second device 120. The second device 120 transmits a scan response message to the fourth device 210 in response to the scan. In response thereto, the second device 120 initiates a procedure for a physical connection with the fourth device 210, and pieces of information for the physical connection, for example, an address and an IP address are exchanged between the second device 120 and the fourth device 210. After the pieces of information are exchanged, the fourth device 210 transmits a physical connection request message, for example, a paring request message to the second device 120. The second device 120 transmits a connection request response message, for example, a paring answer message to the fourth device 210.

5) When the physical connection is completed, the CPNS-enabled entity within the fourth device 210 transmits a discovery request message to the second device 120 right after the physical connection is completed if its own mode is set as a gateway. Here, if the CPNS-enabled entity within the fourth device 210 does not transmit the discovery request message first, but the second device 120 transmits the discovery request message at the same time, pieces of information can overlap with each other. In order to prevent this problem, the fourth device 210 operating as a gateway first transmits the discovery request message right after the physical connection is completed.

Meanwhile, the discovery request message can include the following elements.

EntityInfo element: It includes information on a CPNS-enabled entity that transmits a discovery request message.

UserInfo element: It includes information on the user of a CPNS-enabled entity that transmits a discovery request message. The information on the user can include a user ID lower element and a user name lower element.

PNEID element (or attribute): It is the ID of a PNE when a CPNS-enabled entity that transmits a discovery request message is the PNE.

PN GW ID element (or attribute): It is the ID of a GW when a CPNS-enabled entity that transmits a discovery request message is a PN GW.

PNE Name or PN GW Name element: It is the name of a PNE when a CPNS-enabled entity that transmits a discovery request message is the PNE or it is the name of a GW when a CPNS-enabled entity that transmits a discovery request message is a PN GW.

Figure 10:
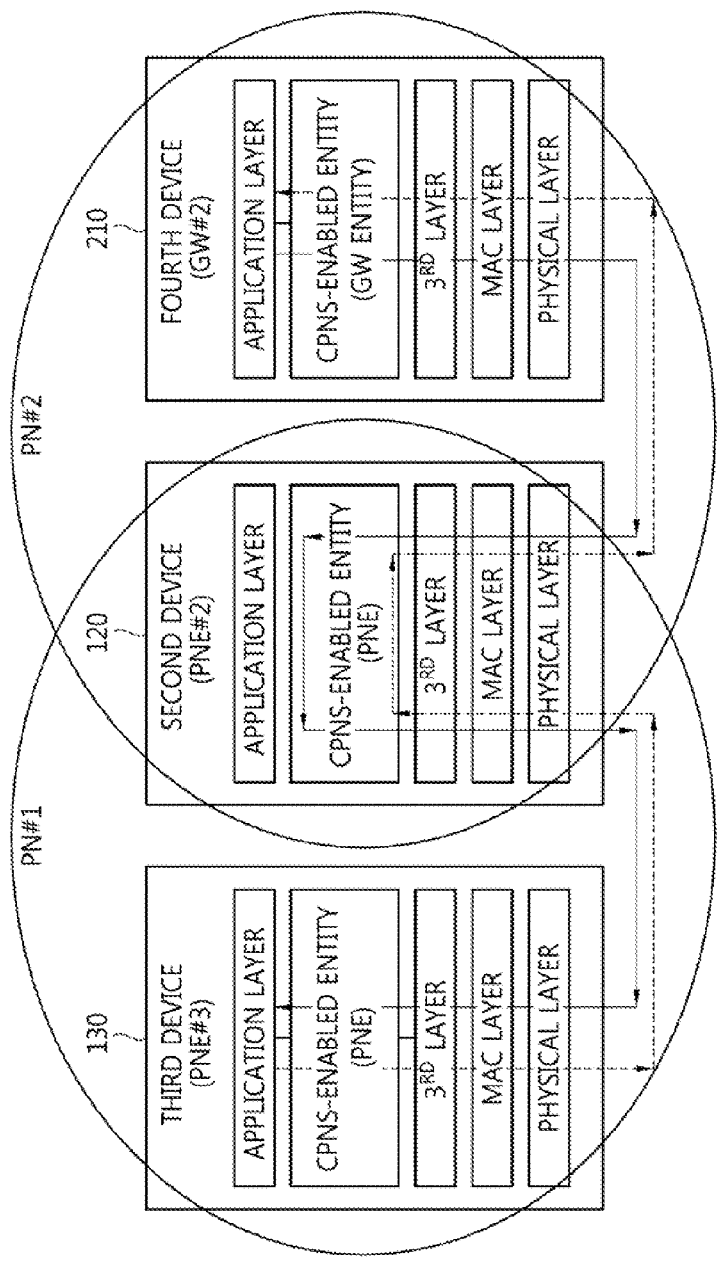
FIG. 10 shows an architecture after mode is changed.

Mode element (or attribute): It is information on activated mode of a CPNS-enabled entity that transmits a discovery request message, and the information has a value indicative of a PNE or a PN GW. If activated mode of the CPNS-enabled entity is a PNE, it has a value of 1. If activated mode is a PN GW, it has a value of 2. In FIG. 10, a value of 2 is included because the CPNS-enabled entity of a third device has been set as a gateway.

PN Info Req element (or attribute): It has a true value or false value, and a true value is included in the PN Info Req element (or attribute) when a CPNS-enabled entity that transmits a discovery request message wants to obtain information on a PN stored by an entity that will receive the discovery request message.

UI Capabilities element (or attribute): It has a true value when a PN GW has to perform a user interaction instead of a PNE. The UI Capabilities element (or attribute) is set by a PNE. For example, when a PNE does not have a user interface, the UI Capabilities element (or attribute) can be set as a true value if a PN GW instead has to perform an interaction with a user.

Zone based service support element (or attribute): It is set as "true" when a PN GW can provide zone-based service.

PN Info element: It is an element included when a CPNS-enabled entity that transmits a discovery request message is a PN GW. The PN Info element includes a PN ID lower element, a PNE Info lower element, etc. If a PN is already present, the PN ID lower element indicates an ID for the PN, and if a PN is already present, the PNE Info lower element includes information on a PNE that belongs to the PN. The PNE info lower element includes a PNE ID element and a PNE Name element.

The above-described discovery request message can be the same as Table 1 below.

the received message and checks the ID of the counterpart through an Entity Info element.

If checked mode of the counterpart is the gateway GW#2, the CPNS-enabled entity within the second device 120 determines not to transmit a discovery request message additionally and generates a discovery response message. Here, the generated discovery response message can include the following elements.

Entity Info element: It is information on a CPNS-enabled entity that has received a discovery request, and the Entity Info element includes a user ID lower element and a user name lower element.

PNE ID element: It includes the ID of a PNE when a CPNS-enabled entity that has received the discovery request is the PNE.

PNE Name element: It includes the name of a PNE when a CPNS-enabled entity that has received the discovery request is the PNE.

Mode element: It includes a value indicative of PNE mode.

UI Capa element: It has a true value when a PN GW performs a user interaction instead of a PNE. The UI Capa element is set by a PNE. For example, if a PNE does not have a user interface and a PN GW instead

TABLE 1

| ELEMENT | DESCRIPTION |
|---|---|
| UserInfo | Includes UserID and UserName. |
| | UserID — ID of a CPNS user |
| | UserName — Name of a CPNS user |
| EntityInfo | It is an abbreviation of entity information and it can include PNEID, PNGWID, Name, Mode, PN Info Req, UI Capa, Zone based service support, and Broadcast group key delivery support element. |
| | PNEID — ID of a PNE |
| | PNGWID — PN ID of a GW |
| | Name — name of PNE or PN GW |
| | Mode — Mode of the subject that performs transmission. If a PNE performs transmission, mode has a value of 1. If a PN GW performs transmission, mode has a value of 2. If a PNE and a GW can operate at the same time, mode has a value of 3. |
| | PNInfoReq — It is set as tree when PN Info is requested if a PNE sends a message. |
| | UICapa — It is set as true if a PN GW interacts with a user because a device operating as a PNE does not have a user interface. |
| | Zone based service support — It is set as true if a PN GW provides zone-based service. |
| PN Info | It includes information on a PN so that a PNE can join the PN if the subject that transmits a discovery request message is a PN GW and has the PN. PN Info can include a PN ID, Description, and PNE Info lower element. |
| | PNID — ID of a PN |
| | Description — Description of PN |
| | PNE Info — It includes information on PNEs, that is, members of a PN. It can include a PNEID and a PNE Name as lower elements. It can also include Device Info as a lower element. |
| | PNEID — ID of a PNE |
| | PNEName — Name of a PNE |
| | Device Info — It is information on a device. It can include Mode element and InactiveMode. |
| | Mode — It can include information on mode that is now activated. |
| | Inactive Mode — It includes information on deactivated mode. |

Thus, the CPNS-enabled entity of the second device 120 checks an element for service, for example, Zone based service support within the received discovery request message.

Furthermore, the CPNS-enabled entity within the second device 120 checks that a counterpart that has sent the message is in what mode through a Mode element based on performs a user interaction with a user, the UI Capa element can be set to a true value.

PN Info element: If the value of a PN Info Req element within the received discovery request message is set as true, the PN Info element is included. If the value of the PN Info Req element within the received discovery request message is set as True, the second device 120 operating as a PNE includes information on the PN#1, already configured along with the first device 110, in the PN Info element. The PN Info element can include a PN ID element, a Description element, etc in its lower position.

PNE Info element: It includes information on members of a PN.

The above-described discovery response message can be the same as Table 2 below.

6) Meanwhile, when the discovery procedure is completed based on the above signals, the fourth device 210 performs a PN establishment procedure.

Concretely, the fourth device 210 starts a PN#2 establishment procedure in order to enlist the second device 120 in its own PN#2. Concretely, the CPNS-enabled entity of the

TABLE 2

| ELEMENT | | DESCRIPTION |
|---|---|---|
| UserInfo | \multicolumn{2}{l}{Include UserID and UserName.} |
| | UserID | ID of a user |
| | UserName | Name of a user |
| EntityInfo | \multicolumn{2}{l}{It is an abbreviation of entity information and it can include PNEID, PNGWID, Name, Mode, PN Info Req, and UI Capa element.} |
| | PNEID | ID of a PNE |
| | PNGWID | ID of a PN GW |
| | Name | Name of a PNE or PN GW |
| | Mode | Mode of the subject that transmits a discovery response message. It has a value of 1 when a PNE transmits the discovery response message and a value of 2 when a PN GW transmits the discovery response message. If the subject can operate as a PNE and a GW at the same time, mode has a value of 3. |
| | UICapa | It is set as true if a PN GW interacts with a user because a device operating as a PNE does not have a user interface. |
| PN Info | \multicolumn{2}{l}{PN Info includes information on a PN if the subject that transmits a Discovery Response message is a PNE and the PNE already participates in another PN. PN Info can include a PN ID, Description, and PNE Info lower element.} |
| | PNID | ID of a PN |
| | Description | Description of a PN |
| | PNEInfo | It includes information on PNEs, that is, members of a PN. It can include a PNEID and a PNE Name as lower elements. It can also include Device Info as a lower element. |
| | PNEID | ID of a PNE |
| | PNEName | Name of a PNE |
| | DeviceInfo | It is information on a device. It can include a Mode element and InactiveMode. |
| | Mode | It can include information on mode that is now activated. |
| | InactiveMode | It includes information on deactivated mode. |

When the discovery response message is received from the second device 120, the fourth device 210 checks elements within the discovery response message. That is, the fourth device 210 checks that the second device operates in what mode by checking a Mode element based on the received discovery response message and also checks what devices are included in the PN#1 and that the devices operate in what mode by checking a PN Info element additionally.

fourth device 210 transmits a PN setup request message to the second device 120. Here, the PN setup request message can include information on the gateway and information on entities (e.g., the CPNS-enabled entity within the first device) that will belong to a PN to be generated.

The PN setup request message can be the same as Table 3 below.

TABLE 3

| ELEMENT | | DESCRIPTION |
|---|---|---|
| Origin Entity ID | | ID of a CPNS-enabled entity that tries to set up a PN |
| PN Setup Type | | It indicates how PN should be set up. 1: a PN GW and a PNE are included in a one-to-one manner. 2: A PNE sets up a PN with all devices connected to a PN GW. 3: A PN is set up with only specific invited PNEs. |
| Invited PNE ID | | It includes the IDs of PNEs to be invited during a PN setup process. |
| PN Info | | It is information on a PN that will be registered and stored in a CPNS server and can include PNID, Description, Disclosure, Ownership Entity, PN GW Info, and PNE Info element. |
| | PN ID | Indicate the ID of a PN. |
| | Description | Description (e.g., home, office) of a PN |
| | PN GW Info | It is information on a PN GW and includes PNGWID and PN GW Name elements. |
| | | PNGWID    ID of a PN GW |
| | | PN GW Name   Name of PN GW |
| | PNE Info | It is information on a PNE and can include PNEID, PNE Name, Mode, Description, Device Capa, and Service Profile |

TABLE 3-continued

| ELEMENT | | DESCRIPTION |
|---|---|---|
| | | elements. |
| | PNE ID | ID of a PNE |
| | PNE Name | Name of a PNE |
| | Mode | Information on mode of a PNE |
| | Description | Description of a PN |
| | Device Capa | Information on the function of a device including a PNE. |
| | Service Profile | Information on a CPNS-enabled application or information on content supporting specific service or state |
| Auth IniData | It is information used to start a PNE authentication procedure and can include Auth PNEID, rand_PNE, and LocalEUKeyAssignment. | |
| | Auth PNEID | ID of a target PNE that should be authenticated by a CPNS server |
| | rand_PNE | Random value generated by a PNE |
| | LocalEUKeyAssignment | Flag indicating the necessary of LocalEUKey allocation TRUE: necessary, and FALSE: unnecessary |

When a PNE receives the PN setup request message from the CPNS-enabled entity of the second device 120, the PNE checks an Origin Entity ID element in order to know that who tries to generate a PN. Furthermore, the PNE extracts PN ID and Msg ID elements from the message.

Furthermore, the CPNS-enabled entity operating as a PNE within the second device 120 generates a PN setup response message as follows.

First, the CPNS-enabled entity operating as the PNE includes the response to the PN setup request message in a Return element within the PN setup response message. The response is 1 in the case of a success and 2 in the case of a failure. Next, the PNE includes a PN Info element for information on a PN, owned by the CPNS-enabled entity of the second device 120, in the PN setup response message. Next, the PNE includes information on a PNE, belonging to the PN owned by the CPNS-enabled entity of the second device 120, in a PNE Info element within the PN setup response message. Furthermore, the PNE includes some elements in the PN setup response message.

The generated message can be the same as Table 4 below.

TABLE 4

| ELEMENT | | DESCRIPTION |
|---|---|---|
| Return | | Indicate whether a PN setup request is successful or not. 1: OK, 2: fail and the request cannot be processed by a CPNS-enabled entity, and 3: not allowed. |
| PN Info | | It is information on a PN and can include PNID, Description, PNGWInfo, and PNEInfo. |
| | PN ID | ID of a PN |
| | Description | Description of a PN |
| | PN GW Info | It is information on a PN GW and can include PNGWID and PN GW Name. |
| | PNGWID | PN ID of a GW |
| | PNGW Name | Name of a PN GW |
| | PNE Info | It is information on a PNE and can include PNEID, PNEName, Mode, Description, DeviceCapa, and ServiceProfile. |
| | PNEID | ID of PNE |
| | PNEName | name of PNE |
| | Mode | Information on mode of a device |
| | Description | Description of a PN |
| | Device Capa | Information on the function of a device including a PNE |
| | Service Profile | Information on a CPNS-enabled application or information on content supporting specific service or state |
| AuthIniData | | It is information used to start a PNE authentication procedure and can include Auth PNEID, rand_PNE, and LocalEUKeyAssignment. |
| | Auth PNEID | ID of a target PNE that should be authenticated by a CPNS server |
| | rand_PNE | Random value generated by a PNE |
| | LocalEUKeyAssignment | Flag indicating the necessary of LocalEUKey allocation TRUE: necessary, and FALSE: unnecessary |
| | Auth FinData | It is information used to by a PNE in order to authenticate a CPNS server and includes HASH. |
| | HASH | Hash value calculated by a target PNE or PN GW |

When the generation of the PN setup response message is completed, the CPNS-enabled entity of the second device 120 transmits the generated message to the fourth device 210.

When the CPNS-enabled entity of the fourth device 210 receives the PN setup response message, the CPNS-enabled entity of the fourth device 210 checks a Return element within the received message in order to know whether the second device 120 wants to participate in the PN. If the value of the Return element is set to 1, the CPNS-enabled entity of the fourth device 210 generates information on a PN inventory for the PN, generates a routing table based on information from the received message, and maintains the routing table.

Meanwhile, the CPNS-enabled entity of the fourth device 210 generates a PN setup request message to be transmitted to the CPNS server.

Concretely, the CPNS-enabled entity of the fourth device 210 includes the ID of a PN GW in an OriginEntityID element. Furthermore, the CPNS-enabled entity of the fourth device 210 includes information on a PN to be generated in the PN Info element of the PN setup request message. Here, the PN Info element includes a PN ID element including the ID of the PN generated by the PN GW, a Description element including a description of the generated PN, etc. Furthermore, the CPNS-enabled entity of the fourth device 210 includes a PN GW Info element in the PN setup request message. Here, the PN GW Info element includes a PN GW ID element indicative of the ID of the PN GW and a PN GW Name element indicative of the name of the PN GW. Furthermore, the CPNS-enabled entity of the fourth device 210 includes a PNE Info element and an Auth Ini Data element in the PN setup request message.

When the generation of the PN setup request message is completed as described above, the CPNS-enabled entity of the fourth device 210 transmits the generated PN setup request message to the CPNS server 300.

When the CPNS server 300 receives the PN setup request message from the fourth device 210, the CPNS server 300 generates an authentication request message and transmits the authentication request message to the second device 110 through the fourth device 210.

The second device 120 transmits an authentication response message to the CPNS server 300 through the fourth device 210.

If, as a result of the check of the authentication response message, the authentication is successful, the CPNS server 300 registers the PN information included in the PN setup request message and stores the PN information in a PN inventory.

The CPNS server 300 sends a PN setup response message and transmits the PN setup response message to the fourth device 210.

When the fourth device 210 receives the PN setup response message from the CPNS server, the fourth device 210 stores the PN information in its local PN inventory. Furthermore, the third device 210 generates a PN establishment notification message and transmits the PN establishment notification message to the second device 120.

7) Meanwhile, when the PN#2 establishment procedure is completed as described above, a bridge determination procedure is performed.

Concretely, the CPNS server 300 determines whether or not one of devices within the PN#1 of the user A has to be operated as a bridge. If it is determined that one of the devices within the PN#1 of the user A has to be operated as a bridge, the CPNS server 300 determines the subject that must be operated as the bridge from among the devices. In FIG. 6, it is assumed that the second device 200 has been determined to operate as the bridge.

When the second device 120 is determined to operate as the bridge, the CPNS server 300 transmits a bridge request message to the second device 120 through the fourth device 210. The bridge request message can include the ID of the subject that is determined as the bridge.

When the second device 120 receives the bridge request message, the second device 120 transmits the bridge request message to the first device 110, that is, the gateway of the PN#1 to which the second device 120 belongs.

When the first device 110 receives the bridge request message, the first device 110 determines whether or not to operate the second device 120 as the bridge based on user setting, etc.

If it is determined that the second device 120 is operated as the bridge, the first device 110 transmits a bridge response message, including an indicator indicative of allowance, to the second device 120. The bridge response message can further include information on the PN#1. Furthermore, the bridge response message can include information on the status of devices that belong to the PN#1.

When the second device 120 receives the bridge response message, the second device 120 checks whether or not a bridge operation is allowed by checking the indicator within the bridge response message.

If it is checked that the bridge operation is allowed based on the indicator, the second device 120 activates the bridge and transmits the bridge response message to the CPNS server 300 through the fourth device 210.

Meanwhile, if there is service data to be provided to the user A, the illustrated application server 400 transmits an information request message to the CPNS server 300 because it does not know that the devices of the user A are located where and that it has to transmit the service data to what device. The information request message can include the ID of the user A.

When the CPNS server 300 receives the information request message, the CPNS server 300 checks that the devices of the user A are located where based on the ID of the user A. If it is checked that the second device 120 of the user A is located within the coverage of the PN#2, the CPNS server 300 transmits information, indicating that the second device 120 operates as the bridge, to the application server 400.

The application server 400 can transmit service data to the second device 120 of the user A based on the information.

As described above, in the first embodiment, the procedure in which a specific device, for example, the second device 120 is made to operate as the bridge has been described.

Figure 7:
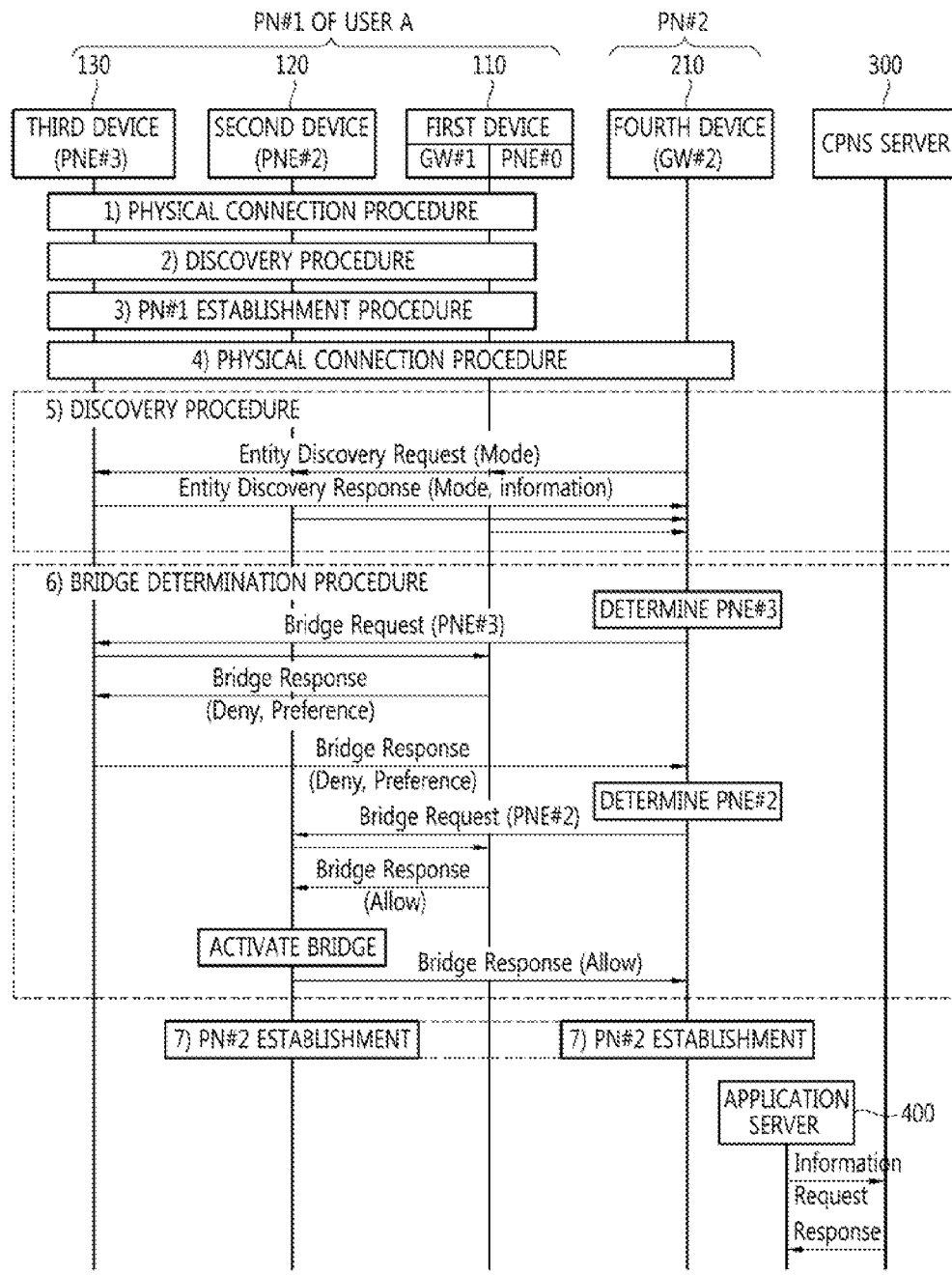
FIG. 7 shows a signal flow for operating a specific device as a bridge in accordance with a second embodiment.

FIG. 7 shows a signal flow for operating a specific device as a bridge in accordance with a second embodiment.

As can be seen with reference to FIG. 7, unlike the first embodiment, the second embodiment illustrates that a determination of whether a specific one of the devices of a user A will be operated as a bridge and if a specific device has to be operated as a bridge, which device will be operated as the bridge is performed by a fourth device 210 operating as a gateway.

Concretely, as can be seen with reference to FIG. 7, the user A owns a first device 110 operating as a gateway (e.g., a GW#1), a second device 120 operating as a PNE#2, and a third device 130 operating as a PNE#3. It is assumed that the first device 110 is a cellular phone and the second device 120 and the third device 130 are portable multimedia devices.

1) When the first device 110, and the second device 120 and the third device 130 are located a short way off, a physical connection procedure is performed. Here, a CPNS-enabled entity within the first device 110 reads in its own mode setting value, activates a gateway entity based on the mode setting value, and deactivates a PNE. Likewise, a CPNS-enabled entity within each of the second device 120 and the third device 130 reads in its own mode setting value, activates a PNE based on the mode setting value, and deactivates a gateway entity.

2) Next, a mutual discovery procedure is performed between the first device 110, the second device 120, and the third device 130.

3) Furthermore, first device 110, the second device 120, and the third device 130 generate a PN#1 by performing a PN establishment procedure therebetween.

4) Meanwhile, it is assumed that the user A has geographically moved and moved within the coverage of the PN#2 in the state in which the user A carries the first device 110, the second device 120, and the third device 130. It is here assumed that a PN#2 is managed by the fourth device 210 operating as a gateway (e.g., a GW#2). It is here assumed that the user A wants to receive service provided by the PN#2.

When the user A geographically moves and moves within the coverage of the PN#2 in the state in which the user A carries the devices 110, 120, and 130, the fourth device 210 within the PN#2 performs a physical connection procedure with one or more of the devices 110, 120, and 130.

5) When the physical connection is completed, a CPNS-enabled entity within the fourth device 210 transmits a discovery request message right after the physical connection is completed if its own mode is set as a gateway. This is similar to the description of FIG. 6, and thus a detailed description thereof is omitted.

The CPNS-enabled entity within a device that has received the discovery request message checks mode of a counterpart that has transmitted the message through the Mode element based on the received message and checks the ID of the counterpart through an Entity Info element.

If it is determined that mode of the checked counterpart is the gateway GW#2, the CPNS-enabled entity determines not to transmit a discovery request message additionally and generates and transmits a discovery response message. This is similar to the description of FIG. 6, and thus a detailed description thereof is omitted.

When the discovery response message is received, the fourth device 210 checks elements within the discovery response message. That is, the fourth device 210 checks that the devices operate in what mode by checking a Mode element based on the received discovery response message and further checks that there are what devices within the PN#1 and the devices operate in what mode by checking a PN info element based on the received discovery response message.

6) Meanwhile, when the discovery procedure is completed, a bridge determination procedure is performed. Concretely, the fourth device 210 determines whether or not to operate one of the checked devices as a bridge based on the received discovery response message. If one of the checked devices is determined to be operated as a bridge, the fourth device 210 also determines the subject that must be operated as a bridge from among the devices.

In FIG. 7, for example, the fourth device 210 determines to operate the third device 130, that is, a PNE#3, as a bridge. According to the determination, the fourth device 210 transmits a bridge request message to the third device 130. Here, the bridge request message can include the ID of the subject (i.e., the ID of the PNE#3) that is determined as a bridge.

When the third device 130 receives the bridge request message, the third device 130 transmits the bridge request message to the first device 110, that is, the gateway of the PN#1 to which the third device 130 belongs.

When the first device 110 receives the bridge request message, the first device 110 determines whether or not to operate the third device 130 as a bridge based on user setting, etc. If the third device 130 is determined not to be suitable for being operated as a bridge based on the user setting, etc., the first device 110 transmits a bridge response message, including an indicator indicative of denial, to the third device 130. Here, the bridge response message can further include one or more of user configuration information and information on a device that is suitable for being operated as a bridge.

When the third device 130 receives the bridge response message, the third device 130 checks whether a bridge operation is allowed or not by checking the indicator within the bridge response message. If it is checked that the bridge operation is denied by the indicator, the third device 130 transmits the bridge response message to the fourth device 210.

When the bridge response message is received, the fourth device 210 checks whether the bridge operation is allowed or not by checking the indicator within the bridge response message. If it is checked that the bridge operation is denied by the indicator, the fourth device 210 determines a device suitable for being operated as a bridge based on one or more of user configuration information and information on a preference device which are included in the bridge response message.

In FIG. 7, for example, the fourth device 210 determines that the second device 120, that is, the PNE#2, operates as a bridge.

The fourth device 210 transmits the bridge request message to the second device 120.

When the second device 120 receives the bridge request message, the second device 120 transmits the bridge request message to the first device 110, that is, the gateway of the PN#1, to which the second device 120 belongs.

When the first device 110 receives the bridge request message, the first device 110 determines whether or not to operate the second device 120 as a bridge based on user setting, etc.

If the second device 120 is determined to be operated as a bridge, the first device 110 transmits a bridge response message, including an indicator indicative of allowance, to the second device 120. The bridge response message can further include information on the PN#1. Furthermore, the bridge response message can further include information on the status of the devices belonging to the PN#1.

When the second device 120 receives the bridge response message, the second device 120 checks whether a bridge operation is allowed or not by checking the indicator within the bridge response message.

If it is checked that the bridge operation is allowed by the indicator, the second device 120 activates the bridge and transmits a bridge response message to the fourth device 210.

7) Meanwhile, after the second device 120 is determined as the bridge by way of the aforementioned procedures, the second device 120 and the fourth device 140 perform a PN#2 establishment procedure.

Meanwhile, if an illustrated application server 400 has service data to be transmitted to the user A, the application server 400 transmits an information request message to a CPNS server 300 because it does not know that the devices of the user A are located where and the service data has to transmitted to which device. The information request message can include the ID of the user A.

When the CPNS server 300 receives the information request message, the CPNS server 300 checks that the devices of the user A are located where based on the ID of the user A. If it is checked the second device 120 of the user A is located within the coverage of the PN#2, the CPNS server 300 transmits information, indicating that the second device 120 operates as a bridge, to the application server 400.

The application server 400 can transmit the service data to the second device 120 of the user A based on the information.

In the second embodiment, an example in which a determination of whether a specific one of the devices of a user A will be operated as a bridge and if a specific device has to be operated as a bridge, which device will be operated as the bridge is performed by the fourth device 210 operating as a gateway has been described as described above.

Figure 8:
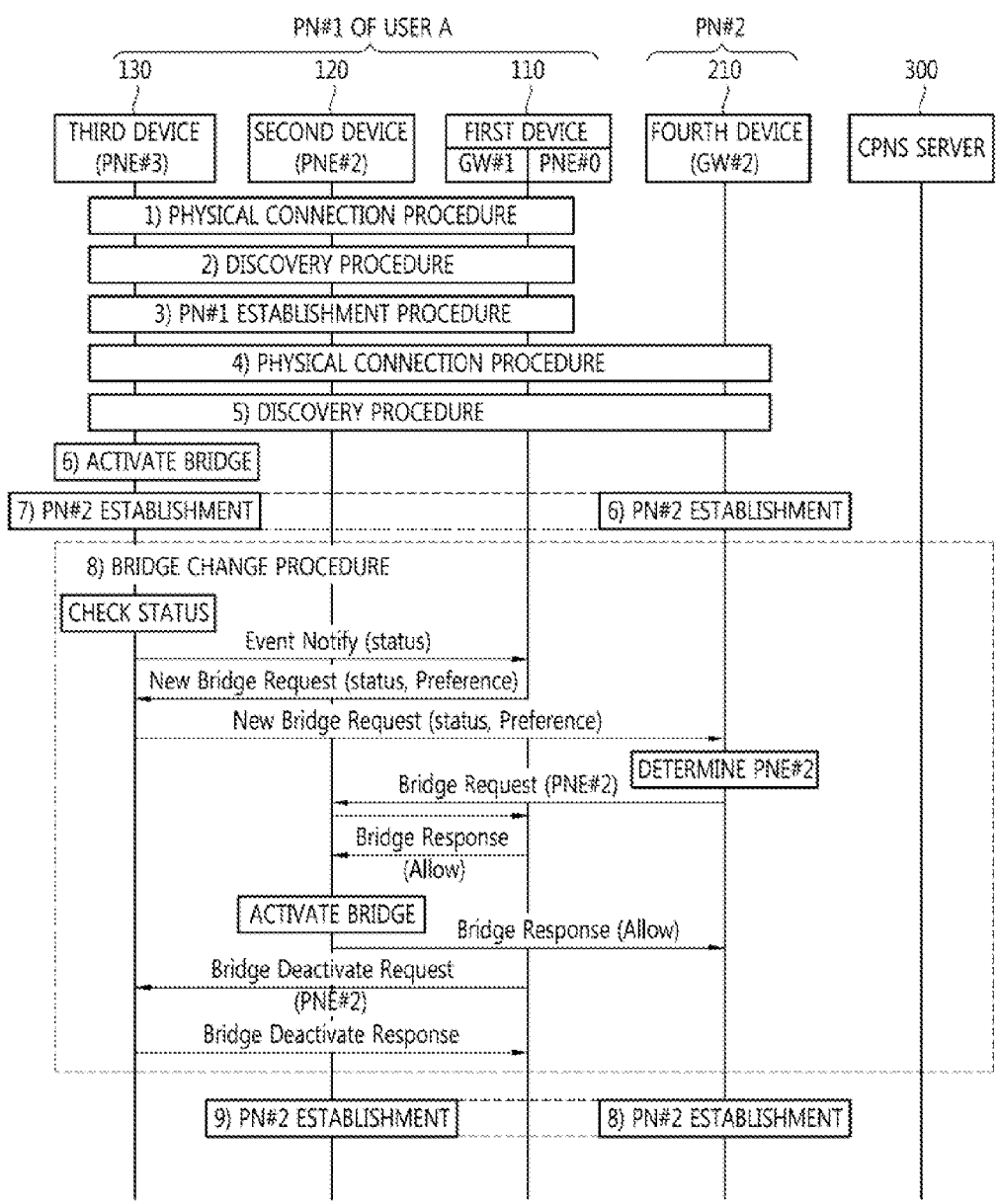
FIG. 8 shows a procedure for changing a bridge into another device depending on the status of a device in accordance with a third embodiment.

FIG. 8 shows a procedure for changing a bridge into another device depending on the status of a device in accordance with a third embodiment.

Concretely, as can be seen with reference to FIG. 8, a user A owns a first device 110 operating as a gateway (e.g., a GW#1), a second device 120 operating as a PNE#2, and a third device 130 operating as a PNE#3. It is assumed that the first device 110 is a cellular phone and the second device 120 and the third device 130 are portable multimedia devices.

1~5) Illustrated procedures 1~5 are similar to those of FIG. 7 and thus are not described, and the description of FIG. 7 is referred.

6) When a discovery procedure is completed, the third device 130 is determined as a bridge according to a bridge determination procedure, and the bridge is activated.

7) If the third device 130 is determined as the bridge, the third device 130 and a fourth device 210 perform a PN#2 establishment procedure.

8) Meanwhile, if the status of the third device 130 is no longer difficult to operate as the bridge, a bridge change procedure is performed.

Concretely, if the third device 130 is difficult to no longer operate as the bridge as a result of the check of its own status, the third device 130 transmits an event notification message to the first device 110, that is, a gateway. Here, the meaning that the third device 130 is in the status in which it difficult to no longer operate as the bridge can be a status in which the third device 130 does not have sufficient power or a user does not want the third device 130 to operate as a bridge. The event notification message can be transmitted according to a Device Management (DM) protocol. The event notification message can include information on the status.

If the third device 130 is not suitable for being operated as the bridge after the first device 110 checks the event notification message, the first device 110 transmits a new bridge request message to the third device 130. The new bridge request message can include one or more of information on the status of the third device and configuration information of the user.

The third device 130 transmits the received new bridge request message to the fourth device 210.

When the fourth device 210 receives the new bridge request message, the fourth device 210 selects a suitable bridge by checking the information on the status of the third device and the configuration information of the user within the message.

In FIG. 8, for example, the fourth device 210 determines that the second device 120, that is, the PNE#2, operates as a bridge.

The fourth device 210 transmits a bridge request message to the second device 120.

When the second device 120 receives the bridge request message, the second device 120 transmits the bridge request message to the first device 110, that is, the gateway of the PN#1, to which the second device 120 belongs.

When the first device 110 receives the bridge request message, the first device 110 determines whether or not to operate the second device 120 as a bridge based on user setting, etc.

If the second device 120 is determined to be operated as the bridge, the first device 110 transmits a bridge response message, including an indicator indicative of allowance, to the second device 120. The bridge response message can further include information on the PN#1. Furthermore, the bridge response message can further include information on the status of devices that belong to the PN#1.

When the second device 120 receives the bridge response message, the second device 120 checks whether a bridge operation is allowed or not by checking the indicator within the bridge response message.

If it is checked that the bridge operation is allowed by the indicator, the second device 120 activates the bridge and transmits a bridge response message to the fourth device 210.

Meanwhile, the first device 110 transmits a bridge deactivation request message to the third device 130. The bridge deactivation request message includes information on the newly determined bridge, for example, information on the PNE#2.

When the bridge deactivation request message is received, the third device 130 checks information within the message. If it is checked that the newly determined bridge normally operates, the third device 130 deactivates its own bridge and transmits a bridge deactivation response message to the first device 110.

9) Meanwhile, after the second device 120 is determined as the bridge, the second device 120 and the fourth device 140 perform a PN#2 establishment procedure.

Figure 9:
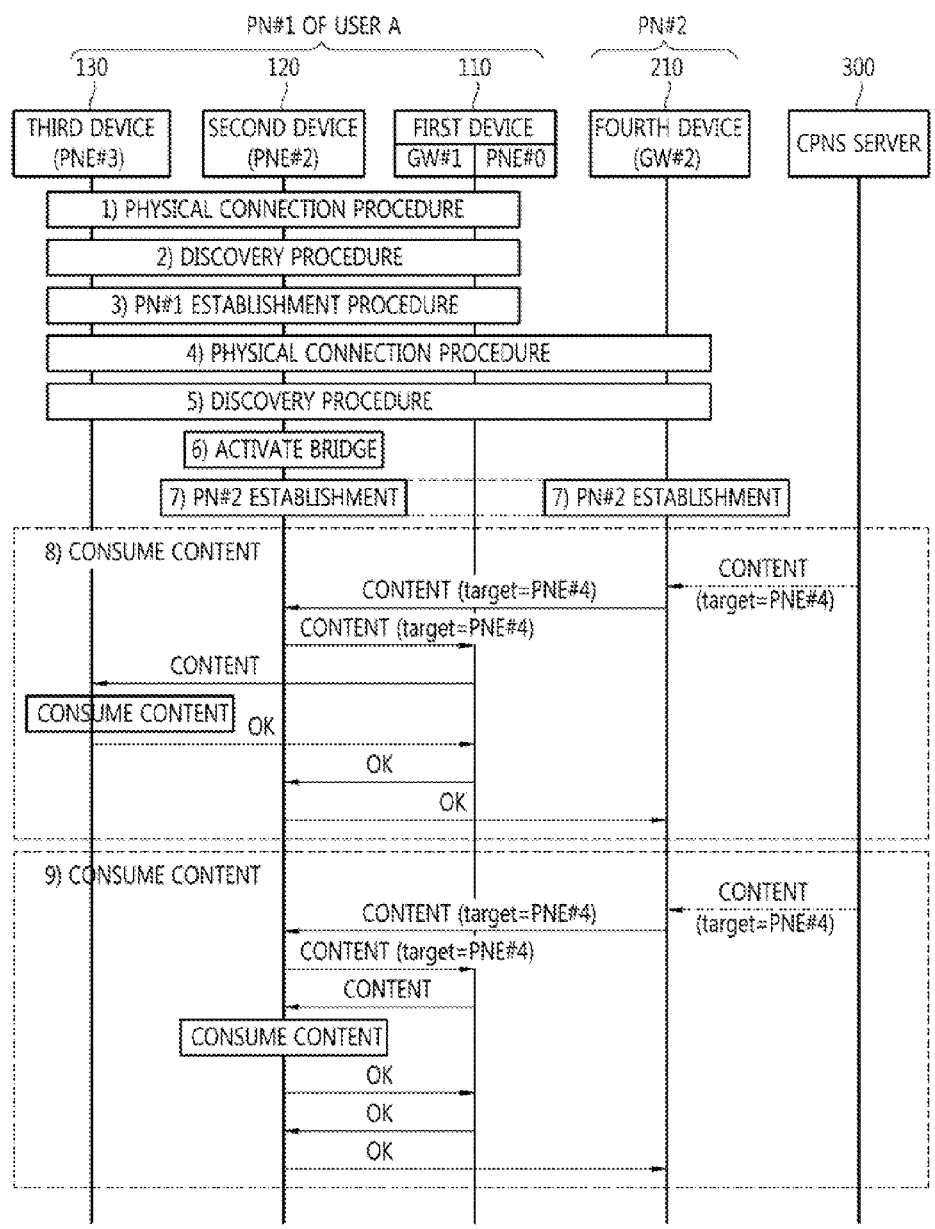
FIG. 9 shows a procedure using content or service after operating as a bridge in accordance with the first to third embodiments.

FIG. 9 shows a procedure using content or service after operating as a bridge in accordance with the first to third embodiments.

Concretely, as can be seen with reference to FIG. 9, the user A owns a first device 110 operating as a gateway (e.g., a GW#1), a second device 120 operating as a PNE#2, and a third device 130 operating as a PNE#3. It is assumed that the first device 110 is a cellular phone and the second device 120 and the third device 130 are portable multimedia devices.

1~5) Illustrated procedures 1~5 are similar to those of FIG. 7 and thus are not described in detail, and the description of FIG. 7 is referred.

6) When a discovery procedure is completed, the second device 120 is determined as a bridge according to a bridge determination procedure, and the bridge is activated.

7) After the second device 120 is determined as the bridge, the second device 120 and the fourth device 140 perform a PN#2 establishment procedure.

8) If a CPNS server 300 has content to be transmitted to the third device 130 through the second device 120 operating as the bridge, the CPNS server 300 transmits the content to a fourth device 210. The fourth device 210 transmits the content to the second device 120 operating as the bridge.

Thus, the second device 120 transmits the content to the first device 110, that is, its own gateway. The first device 110 transmits the content to the third device 130. The third device 130 uses the content and transmits a response message to the first device 110. The first device 110 transmits the response message to the second device 120 operating as the bridge, and the second device 120 transmits the response message to the fourth device 210.

9) Meanwhile, the second device 120 may operate as the bridge, but may receive and use content therefor. A person having ordinary skill in the art can easily know these procedures with reference to the procedure of 8, and thus these procedures are not described in detail.

FIG. 10 shows an architecture after mode is changed.

As can be seen with reference to FIG. 10, each of second, third, and fourth devices 120, 130, and 210 includes a physical layer, a MAC layer, a $3^{rd}$ layer, a CPNS-enabled entity, and an application layer. Here, a PNE is driven within each of the CPNS-enabled entities of the second device 120 and the third device 130, and a gateway entity is driven within the CPNS-enabled entity of the fourth device 210.

As indicated by a thick solid line of FIG. 10, service data is transmitted to the second device 120 via the CPNS-enabled entity, the $3^{rd}$ layer, the MAC layer, and the physical layer of the fourth device 210. When the second device 120 receives the service data, the PNE of the CPNS-enabled entity receives the service data through the physical layer, the MAC layer, and the $3^{rd}$ layer and then transmits the service data to the third device 130 through the $3^{rd}$ layer, the MAC layer, and the physical layer.

Figure 11:
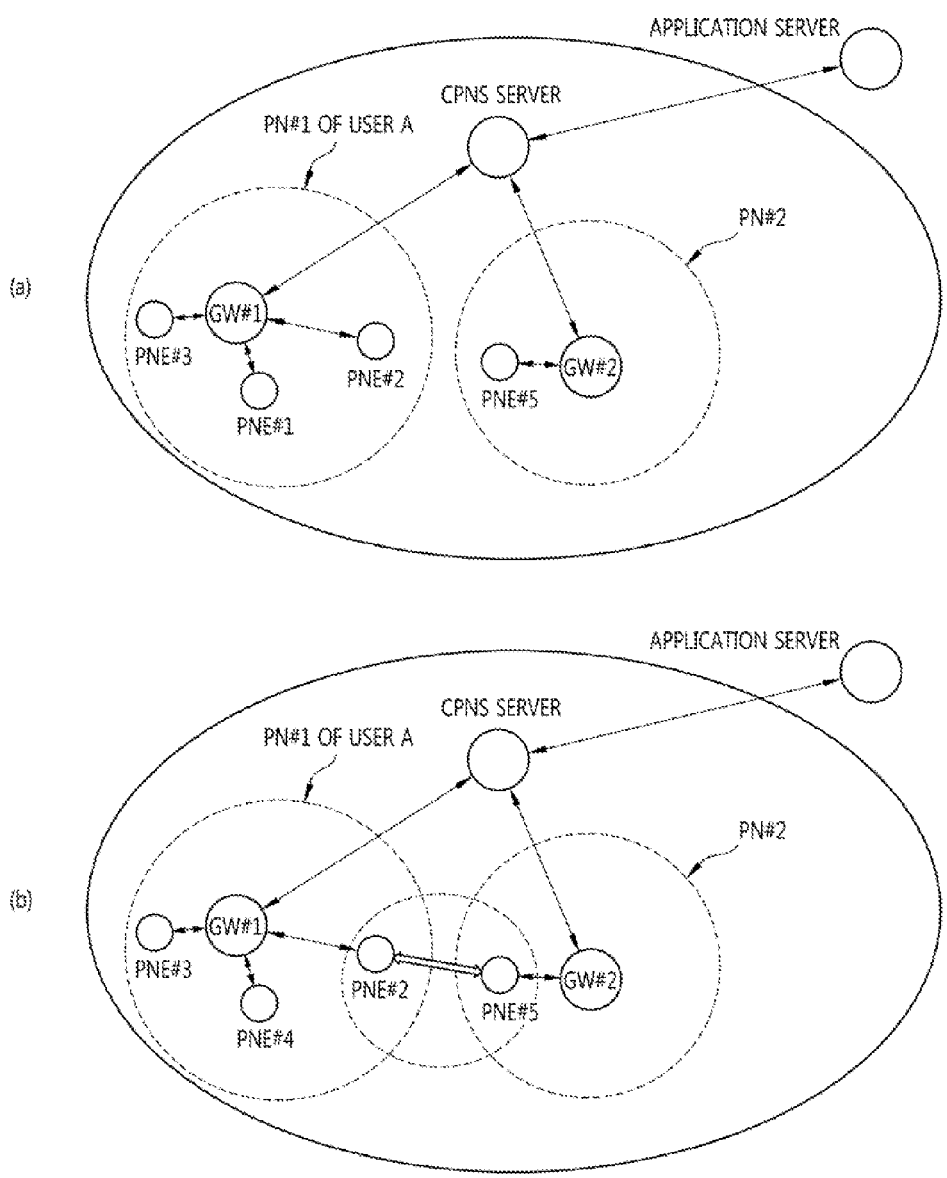
FIG. 11 shows an example in which two devices operate as bridges.

FIG. 11 shows an example in which two devices operate as bridges.

First, FIG. 11(a) illustrates two PNs, a CPNS server, and an application server. The PN#1 of the two PNs has been generated by a user A. The PN#1 includes the devices of a user A and can include, for example, a GW#1, a PNE#1, a PNE#2, and a PNE#3 as shown. Here, it is assumed that the GW#1 is the cellular phone of the user A and the PNE#1, the PNE#2, and the PNE#3 are the portable multimedia devices of the user A. Meanwhile, the PN#2 of the two PNs includes a GW#2 and a PNE#5. The application server can provide service to the PNE of each PN through the CPNS server, the GW#1, and the GW#2.

Meanwhile, the user A wants to receive service provided by the PN#2. However, there is a disadvantage in that the user A cannot receive the service provided within the PN#2 if the user A does not move to the coverage of the PN#2 geographically.

In order to solve the disadvantage, if the PNE#2 within the PN#1 and the PNE#5 within the PN#2 can communicate with each other as in FIG. 11(b), the PNE#1 and the PNE#5 can be operated as bridges and thus the user A can be provided with the service within the PN#2.

The above solution is described in more detail with reference to FIGS. 12 and 13.

Figure 12:
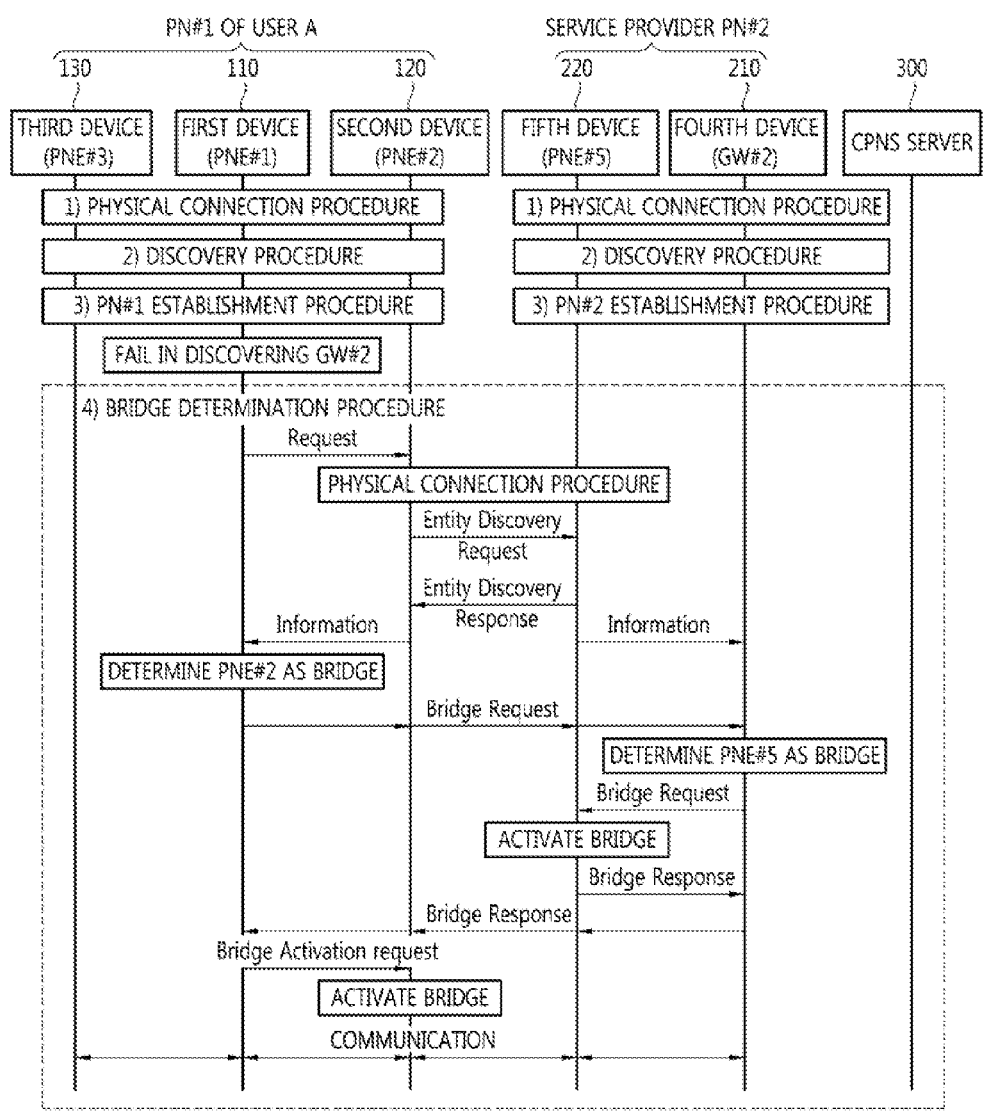
FIG. 12 shows a procedure for operating two devices as bridges in accordance with a fourth embodiment.

FIG. 12 shows a procedure for operating two devices as bridges in accordance with a fourth embodiment.

As shown in FIG. 12, a user A owns a first device 110 operating as a gateway (e.g., a GW#1), a second device 120 operating as a PNE#2, and a third device 130 operating as a PNE#3. It is assumed that the first device 110 is a cellular phone and the second device 120 and the third device 130 are portable multimedia devices. Furthermore, a service provider owns a fourth device 200 operating as a gateway (e.g., a GW#2) and a fifth device 220 operating as a PNE#5.

1) When the first device 110, the second device 120, and the third device 130 of the user A are located a short way off, a physical connection procedure is performed. Furthermore, when the fourth device 210 and the fifth device 220 of the service provider are located a short way off, a physical connection procedure is performed.

2) Next, a mutual discovery procedure is performed between the first device 110, the second device 120, and the third device 130. Furthermore, a mutual discovery procedure is performed between the fourth device 210 and the fifth device 220.

3) The first device 110, the second device 120, and the third device 130 generate a PN#1 by performing a PN establishment procedure therebetween. Likewise, the fourth device 210 and the fifth device 220 generate a PN#2 by performing a PN establishment procedure therebetween.

Meanwhile, it is assumed that the first device 110 of the user A 110 has wanted to receive service from the service provider, but has failed in discovering the fourth device 210, that is, the GW#2 of the service provider in a discovery procedure.

4) Thus, the first device 110 performs a bridge determination procedure in order to receive the service from the fourth device 210, that is, the GW#2 of the service provider.

Concretely, the first device 110 transmits a request message to the second device 120 operating as a PNE.

In response thereto, the second device 120 performs a physical connection procedure with devices to which the second device 120 can be physically connected nearby, for example, the fifth device 220. When the physical connection is completed, the second device 120 transmits a discovery request message, for example, an entity discovery request message to the fifth device 220. The entity discovery request message includes an element including information on the PN#1 and an element including information on the gateway GW#1.

In response to the reception of the discovery request message, the fifth device 220 transmits a discovery response message, for example, an entity discovery response message to the second device 120. Here, the fifth device 220 includes a PN info element, including information on the PN#2 owned by the fifth device 220, and an element, including information on the gateway GW#2, in the entity discovery response message.

When the second device 120 receives the entity discovery response message, the second device 120 extracts information from the elements within the message and transmits the extracted information to the first device 110. Likewise, the fifth device 220 extracts information from the elements within the entity discovery request message and transmits the extracted information to the fourth device 210.

The first device 110 and the fourth device 210 check whether or not there can be connected to each other through the second device and the fifth device based on the information. If the first device 110 and the fourth device 210 can be connected to each other through the second device and the fifth device, the first device 110 determines to operate the second device, that is, the PNE#2, as a bridge.

Next, the first device 110 transmits a bridge request message to the second device 120. The second device 120 transmits the bridge request message to the fifth device 220, and the fifth device 220 transmits the bridge request message to the fourth device 210.

When the fourth device 210 receives the bridge request message, the fourth device 210 determines to operate the fifth device, that is, the PNE#5, as a bridge and transmits the bridge request message to the fifth device 220.

When the fifth device 220 receives the bridge request message from the fourth device 210, the fifth device 220 activates a bridge function and transmits a bridge response message to the fourth device 210.

The fourth device 210 transmits the bridge response message to the first device 110 through the fifth device 220 and the second device 120.

When the first device 110 receives the bridge response message, the first device 110 transmits the bridge request message to the second device 120, and the second device 120 activates the bridge function in response to the bridge request message received from the first device 110.

When the second device 120 and the fifth device 220 operate as bridges as described above, the PN#1 of the user A and the PN#2 of the service provider can be coupled. Accordingly, the user A can be provided with service within the PN#2 through a specific device that belongs to its own PN#1.

Figure 13:
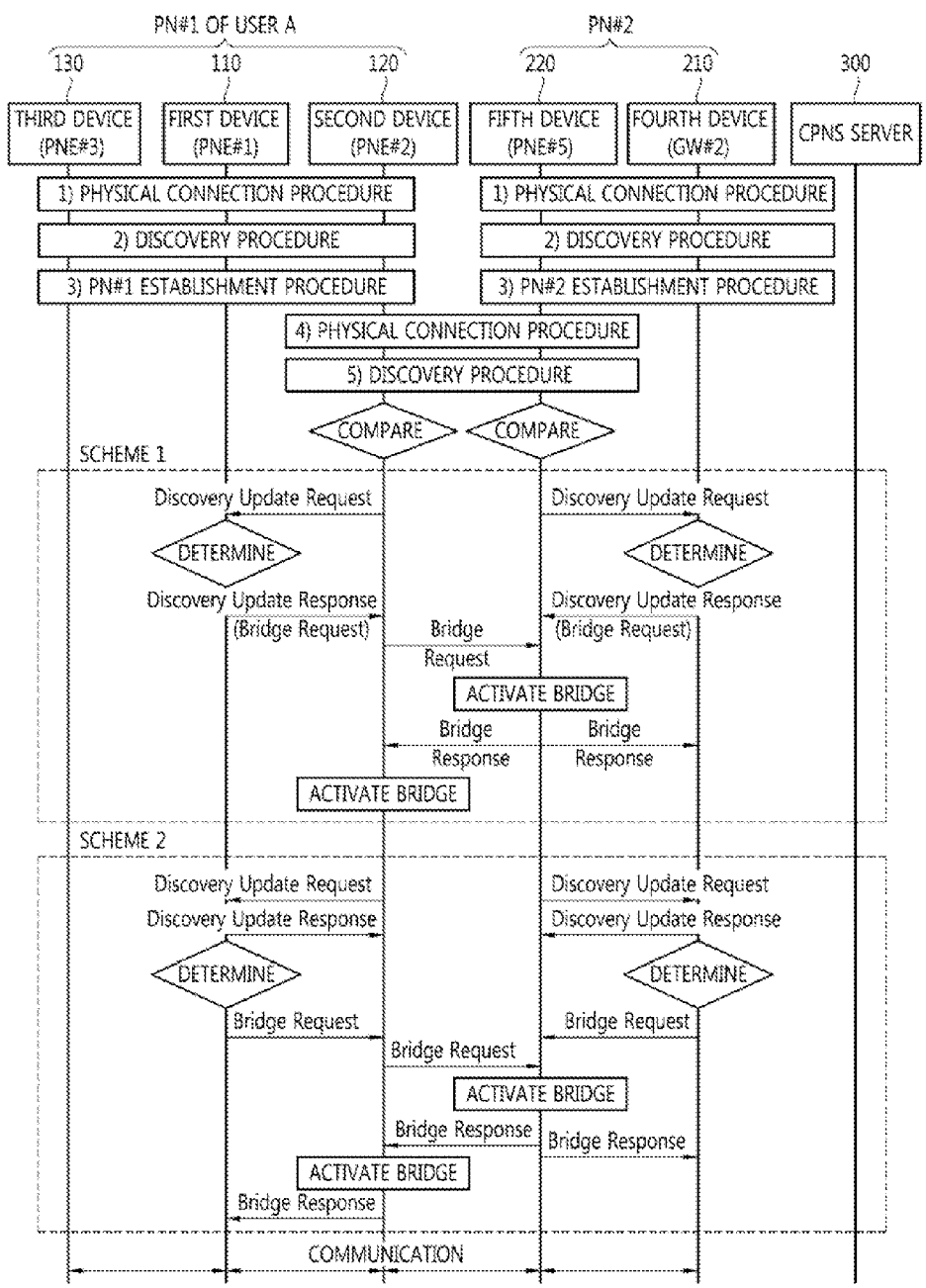
FIG. 13 shows a procedure for operating two devices as bridges in accordance with a fifth embodiment.

FIG. 13 shows a procedure for operating two devices as bridges in accordance with a fifth embodiment.

As shown in FIG. 13, a user A owns a first device 110 operating as a gateway (e.g., a GW#1), a second device 120 operating as a PNE#2, and a third device 130 operating as a PNE#3. It is assumed that the first device 110 is a cellular phone and the second device 120 and the third device 130 are portable multimedia devices. Furthermore, a service provider owns a fourth device 210 operating as a gateway (e.g., a GW#2) and a fifth device 220 operating as a PNE#5.

1) When the first device 110, the second device 120, and the third device 130 of the user A are located a short way off, a physical connection procedure is performed. Furthermore, when fourth device 210 and the fifth device 220 of the service provider are located a short way off, a physical connection procedure is performed.

2) Next, a mutual discovery procedure is performed between the first device 110, the second device 120, and the third device 130. Furthermore, a mutual discovery procedure is performed between the fourth device 210 and the fifth device 220.

3) The first device 110, the second device 120, and the third device 130 generate a PN#1 by performing a PN establishment procedure therebetween. Likewise, the fourth device 210 and the fifth device 220 generate a PN#2 by performing a PN establishment procedure therebetween.

4) Meanwhile, the second device 120 performs a physical connection procedure with devices with which the second device 120 can be physically connected, for example, the fifth device 220.

5) When the physical connection is completed, the second device 120 and the fifth device 220 perform a discovery procedure.

Concretely, the second device 120 transmits a discovery request message, for example, an entity discovery request message to the fifth device 220. The entity discovery request message includes an element including information on the PN#1 and an element including information on the gateway GW#1.

In response the reception of the discovery request message, the fifth device 220 transmits a discovery response message, for example, an entity discovery response message to the second device 120. Here, the fifth device 220 includes a PN info element, including information on the PN#2 owned by the fifth device 220, and an element, including information on the gateway GW#2, in the entity discovery response message.

When the second device 120 receives the entity discovery response message, the second device 120 extracts information from the elements within the message and compares the extracted information with the existing information. Likewise, the fifth device 220 also extracts information from the elements within the entity discovery request message and compares the extracted information with the existing information.

If, as a result of the comparison, the extracted information is different from the existing information, a discovery update procedure is performed and a bridge determination procedure is performed. Here, two schemes can be used.

First, in accordance with a first scheme (scheme 1), the second device 120 and the fifth device 220 transmit respective discovery update request messages to the first device 110 and the fourth device 210. The discovery update request message can include the extracted information.

The first device 110 and the fourth device 210 determine whether or not they can be coupled through the second device 120 and the fifth device 220 based on the pieces of information included in the respective discovery update request message.

If the first device 110 and the fourth device 210 can be coupled through the second device 120 and the fifth device 220, the first device 110 determines to operate the second device 120, that is, the PNE#2, as a bridge. Likewise, the fourth device 210 determines to operate the fifth device 220, that is, the PNE#5, as a bridge.

The first device 110 and the fourth device 210 transmit respective discovery update response messages to the second device 120 and the fifth device 220. Each of the discovery update response messages can include a message, an indicator, or a value that means a bridge request.

When the discovery update response message is received, the second device 120 checks the message, indicator, or value included in the discovery update response message and transmits a bridge request message to the fifth device 220 based on a result of the check.

The fifth device 220 activates a bridge function based on the message, indicator, or value included in the bridge request message from the second device 120 and the discovery update response message from the fourth device 210 and transmits a bridge response message to the second device 120 and the fourth device 210. When the bridge response message is received, the second device 120 checks that the fifth device operates as the bridge and also activates a bridge function.

Meanwhile, in accordance with a second scheme (scheme 2), if, as a result of the comparison, the extracted information is different from the existing information, the second device 120 and the fifth device 220 transmit respective discovery update request messages to the first device 110 and the fourth device 210. Each of the discovery update request messages can include the extracted information.

The first device 110 and the fourth device 210 transmit respective discovery update response messages to the second device 120 and the fifth device 220.

Next, the first device 110 and the fourth device 210 can be coupled through the second device 120 and the fifth device 220 based on the pieces of information included in the respective discovery update request messages.

If the first device 110 and the fourth device 210 can be coupled through the second device 120 and the fifth device 220, the first device 110 determines to operate the second device 120, that is, the PNE#2, as a bridge. Likewise, the fourth device 210 determines to operate the fifth device 220, that is, the PNE#5, as a bridge.

The first device 110 and the fourth device 210 transmit the respective bridge request messages to the second device 120 and the fifth device 220.

When the bridge request message is received, the second device 120 transmits the bridge request message to the fifth device 220.

The fifth device 220 activates a bridge function in response to the bridge request message from the second device 120 and the bridge request message from the fourth device 210 and transmits a bridge response message to the second device 120 and the fourth device 210.

When the bridge response message is received, the second device 120 checks that the fifth device operates as the bridge and also activates a bridge function.

When the second device 120 and the fifth device 220 operate as the bridges as described above, the PN#1 of the user A and the PN#2 of the service provider can be coupled. Accordingly, the user A can be supplied with service within the PN#2 through a specific device that belongs to its own PN#1.

The aforementioned embodiments can be combined. Accordingly, each of the embodiments is not implemented only solely, but the embodiments may be implemented in combination if necessary. The combinations can be readily implemented by a person having ordinary skill in the art who reads this specification, and thus a detailed description thereof is omitted. It is however to be noted that although the combinations are not described, they are not excluded from the present invention, but should be interpreted as being included in the scope of the present invention.

The aforementioned embodiments and modified examples can be implemented by way of a variety of means. For example, the embodiments of the present invention can be implemented by hardware, firmware, software, or a combination of them.

In the case of implementations by hardware, a method according to the embodiments of the present invention can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, etc.

In the case of implementations by firmware or software, a method according to the embodiments of the present invention can be implemented in the form of a module, a procedure, or function that performs the aforementioned functions or operations. A software code can be stored in a memory unit and driven by a processor. The memory unit can be placed inside or outside the processor, and the memory unit can exchange data with the processor by way of a variety of known means.

For example, the methods in accordance with the present invention can be stored in a storage medium (e.g., internal memory, flash memory, or a hard disk) and can be implemented by codes or instructions within a software program capable of being executed by a processor (e.g., a micro processor). This is described below with reference to FIG. 13.

Figure 14:
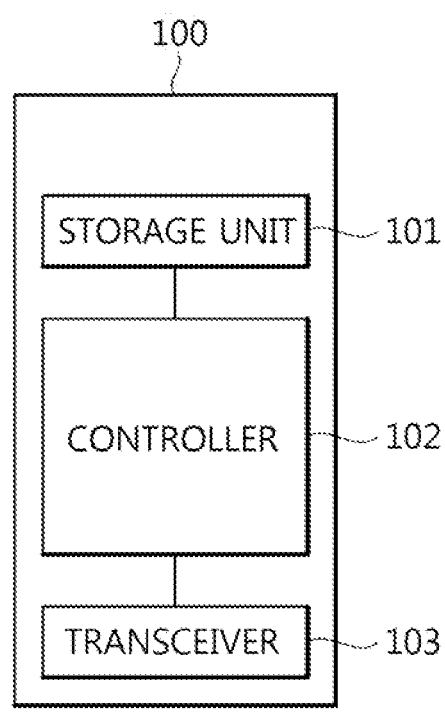
FIG. 14 is a block diagram of a device in accordance with the embodiments of the present invention.

FIG. 14 is a block diagram of a device in accordance with the embodiments of the present invention.

As shown in FIG. 14, a device 100 includes storage means 101, a controller 102, and a transceiver unit 103.

The storage means 101 stores the methods shown in FIGS. 2 to 13.

The controller 102 controls the storage means 101 and the transceiver unit 103. Concretely, the controller 102 executes the methods stored in the storage means 101. Furthermore, the controller 102 transmits the above-described signals through the transceiver unit 103.

The aforementioned embodiments are results in which the elements and characteristics of the present invention are combined in a specific form. Each of the elements or characteristics has to be considered to be optional unless otherwise described explicitly. Each of the elements or characteristics can be implemented in such a way as not to be combined with another element or characteristic. Furthermore, some of the elements and/or the characteristics may be combined to form an embodiment of the present invention. Order of the operations described in the embodiments of the present invention can be changed. Some of the elements or characteristics of one embodiment can be included in the other embodiment or can be replaced with corresponding elements or characteristics of the other embodiment. It is evident that in the claims, an embodiment can be constructed by combining claims not having an explicit citation relation or can be included as a new claim by amendments after an application.

The present invention can be materialized in a specific form without departing from the spirit and essential characteristics of the present invention. Accordingly, the detailed description should not be construed as being limited from all aspects, but should be considered to be being illustrative. The scope of the present invention should be determined by reasonable analysis into the attached claims, and all changes within an equivalent range of the present invention fall within the scope of the present invention. Furthermore, in the claims, an embodiment can be constructed by combining claims not having an explicit citation relation or can be included as a new claim by amendments after an application.

The invention claimed is:

1. A method of communicating data in a wireless communication system including a sever communicating with a plurality of devices, the method comprising:
   determining, by a first device which operates as a gateway mode and which belongs to a first network, whether the first device is able to discover a second network;
   if the first device is unable to discover the second network, transmitting, by the first device, a discovery request message to a second device, which belongs the first network and which operates as an entity mode;
   in response to the discovery request message, receiving, by the first device from the second device, a discovery response message including information on a third device belonging to the second network; and
   transmitting, by the first device to the second device, a bridge request message to enable the second device operates as a bridge for coupling the first network and the second network,
   wherein a device operating as the entity mode communicates with the server via a device operating as the gateway mode.

2. The method of claim 1, wherein the third device operates as the entity mode in the second network.

3. The method of claim 1, wherein the third device operates as the gateway mode in the second network.

4. The method of claim 1, wherein the first device is a Converged Personal Network Service (CPNS)-enabled entity.

5. The method of claim 1, wherein the first network is a first Personal Area Network (PAN) and the second network is a second PAN.

6. A device communicating data in a wireless communication system including a sever communicating with a plurality of devices, the device comprising:
   a transceiver configured to transmit and receive a signal; and a processor coupled to the transceiver and configured to:
- when the device operates as a gateway mode and which belongs to a first network, determine whether the device is able to discover a second network;
- if the device is unable to discover the second network, transmit a discovery request message to a first entity, which belongs the first network and which operates as an entity mode;
- in response to the discovery request message, receive, from the first entity, a discovery response message including information on a second entity belonging to the second network; and
- transmit, to the first entity, a bridge request message to enable the first entity operates as a bridge for coupling the first network and the second network,
- wherein a device operating as the entity mode communicates with the server via a device operating as the gateway mode.

7. The device of claim 6, wherein the second entity operates as the entity mode in the second network.

8. The device of claim 6, wherein the second entity operates as the gateway mode in the second network.

9. The device of claim 6, wherein the device is a Converged Personal Network Service (CPNS)-enabled entity.

10. The device of claim 6, wherein the first network is a first Personal Area Network (PAN) and the second network is a second PAN.

* * * * *